United States Patent
Shimada et al.

(10) Patent No.: US 12,348,166 B2
(45) Date of Patent: Jul. 1, 2025

(54) MOTOR DRIVE APPARATUS, REFRIGERATION CYCLE APPARATUS, AIR CONDITIONER, WATER HEATER, AND REFRIGERATOR

(71) Applicant: Mitsubishi Electric Corporation, Tokyo (JP)

(72) Inventors: Yuhei Shimada, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 195 days.

(21) Appl. No.: 18/259,217

(22) PCT Filed: Feb. 17, 2021

(86) PCT No.: PCT/JP2021/005991
§ 371 (c)(1),
(2) Date: Jun. 23, 2023

(87) PCT Pub. No.: WO2022/176078
PCT Pub. Date: Aug. 25, 2022

(65) Prior Publication Data
US 2024/0048081 A1    Feb. 8, 2024

(51) Int. Cl.
*H02P 25/18* (2006.01)
*F25B 49/02* (2006.01)
*H02P 27/08* (2006.01)

(52) U.S. Cl.
CPC .......... *H02P 25/184* (2013.01); *F25B 49/025* (2013.01); *H02P 27/08* (2013.01);
(Continued)

(58) Field of Classification Search
CPC .......... F25B 2700/171; F25B 2600/111; F25B 49/02; F25B 2600/024; F25B 2600/112;
(Continued)

(56) References Cited

U.S. PATENT DOCUMENTS

| | | | |
|---|---|---|---|
| 11,506,437 | B2 | 11/2022 | Nishiyama et al. |
| 2009/0007579 | A1* | 1/2009 | Natsume .................. F24F 11/62 |
| | | | 62/236 |
| 2022/0006410 | A1 | 1/2022 | Tsuchiya et al. |

FOREIGN PATENT DOCUMENTS

| | | |
|---|---|---|
| JP | 2020-039252 A | 3/2020 |
| JP | 2020-148384 A | 9/2020 |

(Continued)

OTHER PUBLICATIONS

Office Action mailed Mar. 5, 2024 in corresponding Australian Patent Application No. 2021428650.
(Continued)

*Primary Examiner* — Antony M Paul
(74) *Attorney, Agent, or Firm* — Posz Law Group, PLC

(57) ABSTRACT

A motor drive apparatus includes a connection switching device that switches a connection state of windings of a first motor by switches; an inverter that applies an alternating-current voltage to the windings; a first control device that controls the inverter and the connection switching device; and a second control device that controls a second motor for an element that affects the first motor. Control by the first control device when switching includes a first stage of bringing an effective value of alternating current flowing through the windings close to zero compared to that before the connection state is switched; and a second stage of suspending output of the alternating-current voltage from the inverter. The second control device keeps the second motor running during the first and second stages, and the first control device switches the switches in the second stage.

11 Claims, 17 Drawing Sheets

(52) U.S. Cl.
CPC ... *F25B 2600/024* (2013.01); *F25B 2600/111* (2013.01); *F25B 2600/112* (2013.01); *F25B 2700/171* (2013.01); *F25B 2700/172* (2013.01); *F25B 2700/173* (2013.01)

(58) Field of Classification Search
CPC .......... F25B 2700/172; F25B 2700/173; F25B 49/025; H02P 25/184; H02P 27/06; H02P 27/08; H02P 2207/05; H02P 2207/076; H02P 2201/09; H02P 29/02; H02P 29/60; H02P 29/68; H02P 29/67; H02P 5/74; H02P 21/00; H02P 3/18; H02P 5/46
See application file for complete search history.

(56) References Cited

FOREIGN PATENT DOCUMENTS

| WO | 2019/087243 A1 | 5/2019 |
| WO | 2019/207661 A1 | 10/2019 |
| WO | 2020/129170 A1 | 6/2020 |

OTHER PUBLICATIONS

International Search Report of the International Searching Authority dated Apr. 13, 2021, issued in corresponding International Application No. PCT/JP2021/005991 (and English Machine Translation).
Extended European Search Report mailed Mar. 12, 2024 in corresponding European Patent Application No. 21926516.2.
Office Action dated Oct. 31, 2023 issued in corresponding Japanese Patent Application No. 2023-500196 (and English machine translation).

* cited by examiner

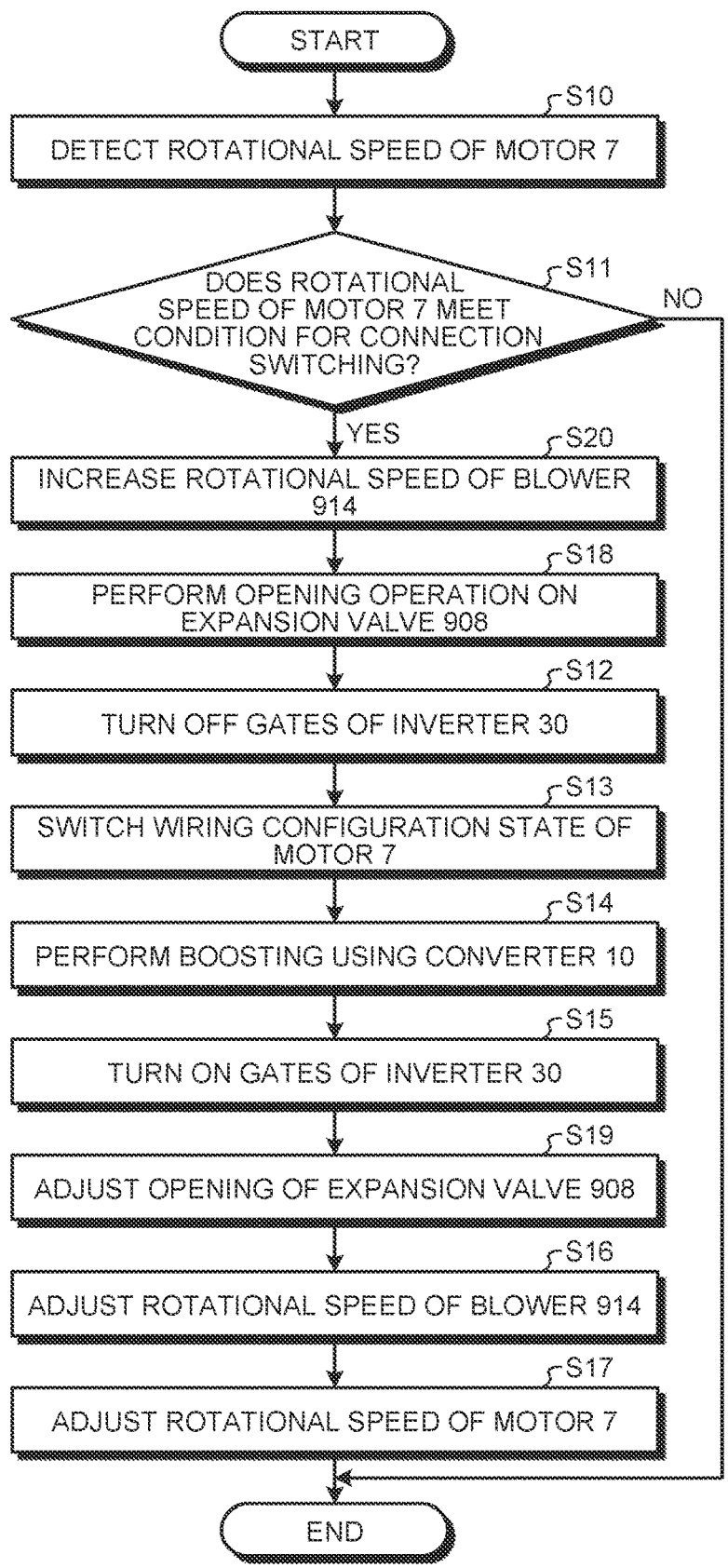

MOTOR DRIVE APPARATUS, REFRIGERATION CYCLE APPARATUS, AIR CONDITIONER, WATER HEATER, AND REFRIGERATOR

CROSS REFERENCE TO RELATED APPLICATION

This application is a U.S. national stage application of International Patent Application No. PCT/JP2021/005991 filed on Feb. 17, 2021, the disclosure of which is incorporated herein by reference.

TECHNICAL FIELD

The present disclosure relates to a motor drive apparatus that drives a motor, a refrigeration cycle apparatus, an air conditioner, a water heater, and a refrigerator.

BACKGROUND

For motors installed in apparatuses such as air conditioners, switching a connection state of windings is conventionally done to improve efficiency.

Patent Literature 1 relates to a drive apparatus for a motor included in a compressor of an air conditioner. The disclosed drive apparatus includes a converter that generates a bus voltage and an inverter that converts the bus voltage into an alternating-current voltage. The drive apparatus switches a connection state of windings by switching a wiring configuration between a first connection state and a second connection state. The drive apparatus disclosed in Patent Literature 1 improves motor efficiency by outputting a lower line voltage from the inverter in the second connection state than in the first connection state and outputting a higher bus voltage from the converter in the second connection state than in the first connection state.

Patent Literature 2 relates to a motor drive apparatus that switches a wiring configuration state by performing a switching operation in switching devices. The disclosed motor drive apparatus performs control that brings a value of alternating current that flows through windings close to zero before suspending an alternating-current voltage that an inverter outputs and performing the switching operation in the switching devices.

PATENT LITERATURE

Patent Literature 1: Japanese Patent Application Laid-open No. 2020-39252
Patent Literature 2: PCT International Publication No. 2019/087243

The drive apparatus disclosed in Patent Literature 1 suspends the motor when switching the wiring configuration state and restarts the motor after elapse of a period for refrigerant pressure to become uniform in a refrigeration cycle. In this case, since the compressor cannot pressurize a refrigerant until the motor is restarted, efficiency of the refrigeration cycle may be lowered. If the efficiency of the refrigeration cycle is lowered, cooling or heating capacity goes down, so indoor comfort becomes difficult to maintain.

The motor drive apparatus disclosed in Patent Literature 2 allows a motor to rotate by inertia while suspending the output of the alternating-current voltage from the inverter, thus enabling the switching the wiring configuration state without suspending rotation operation of the motor. In this case, with the output of the inverter suspended, a load associated with a heat load of a refrigeration cycle is applied to the motor and may cause the motor to stop, not enabling the motor to keep rotating. Therefore, switching the wiring configuration state may not be possible during the motor rotation. Alternatively, steep deceleration of the motor rotation may occur, which leads to a delay in speed recovery of the motor after switching the wiring configuration state that may lower the efficiency of the refrigeration cycle. A problem with the conventional technique described in Patent Literature 1 or 2 is that an efficiency of an apparatus having a motor may be lowered in the above manner.

SUMMARY

The present disclosure has been made in view of the above, and an object of the present disclosure is to obtain a motor drive apparatus that is capable of preventing efficiency of an apparatus having a motor from being lowered.

In order to solve the problem mentioned above and achieve the object, a motor drive apparatus according to the present disclosure includes a connection switching device that includes a switch and switches a connection state of a winding of a first motor through switching operation of the switch during rotation operation of the first motor; an inverter that applies an alternating-current voltage to the winding via the switch; a first control device that controls the inverter and the connection switching device; and a second control device that controls a second motor serving as a drive source for an element that affects a load on the first motor. Control that the first control device performs when switching the connection state includes a first stage of bringing an effective value of alternating current that is to flow through the winding close to zero compared to an effective value of alternating current that has flowed through the winding before the connection state is switched; and a second stage of suspending output of the alternating-current voltage from the inverter. The second control device keeps the second motor running during a period including the first stage and the second stage. The first control device causes the switch to perform the switching operation in the second stage.

The motor drive apparatus according to the present disclosure has an effect of preventing efficiency of an apparatus having a motor from being lowered.

BRIEF DESCRIPTION OF DRAWINGS

FIG. 20 is a flowchart illustrating an operational procedure for a refrigeration cycle apparatus according to a fourth embodiment to switch the wiring configuration state of the motor.

DETAILED DESCRIPTION

With reference to the drawings, a detailed description is hereinafter provided of motor drive apparatuses, refrigeration cycle apparatuses, air conditioners, a water heater, and a refrigerator according to embodiments.

First Embodiment

Figure 1:
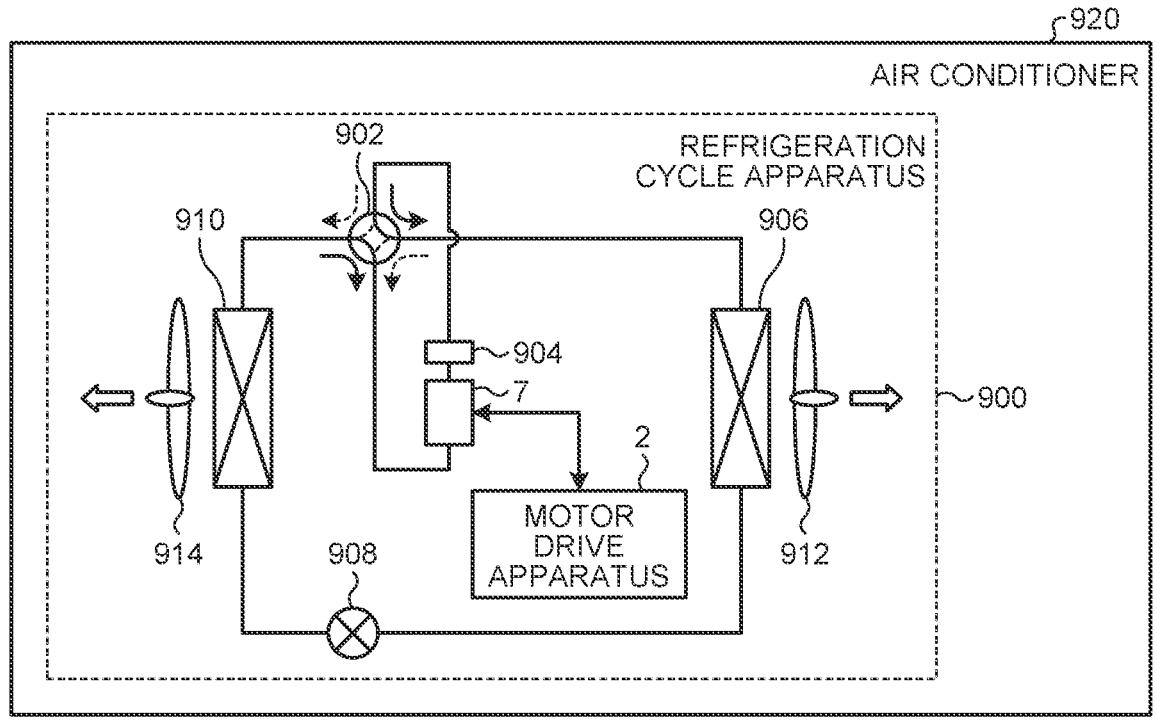
FIG. 1 is a schematic diagram of an air conditioner including a motor drive apparatus according to a first embodiment.

FIG. 1 is a schematic diagram of an air conditioner 920 including a motor drive apparatus 2 according to a first embodiment. The air conditioner 920 includes a refrigeration cycle apparatus 900. The refrigeration cycle apparatus 900 includes a compressor 904 that pressurizes a refrigerant; heat exchangers 906 and 910 that perform heat exchange between the refrigerant discharged from the compressor 904 and air; blowers 912 and 914 that provide the heat exchangers 906 and 910 with air supplies; an expansion valve 908 that expands the refrigerant; a four-way valve 902 that changes a flow direction of the refrigerant; and the motor drive apparatus 2. The refrigeration cycle apparatus 900 can switch between heating operation and cooling operation through switching of the four-way valve 902.

During the heating operation, the refrigerant discharged from the compressor 904 flows through the four-way valve 902 in a direction indicated by a solid-line arrow. The refrigerant discharged from the compressor 904 returns to the compressor 904 through the four-way valve 902, the indoor heat exchanger 906, the expansion valve 908, the outdoor heat exchanger 910, and the four-way valve 902. During the cooling operation, the refrigerant pressurized by the compressor 904 flows through the four-way valve 902 in a direction indicated by a dashed-line arrow. The refrigerant discharged from the compressor 904 returns to the compressor 904 through the four-way valve 902, the outdoor heat exchanger 910, the expansion valve 908, the indoor heat exchanger 906, and the four-way valve 902.

During the heating operation, the heat exchanger 906 operates as a condenser to release heat. The heat exchanger 910 operates as an evaporator to absorb heat. The air conditioner 920 heats a room through the heat release of the heat exchanger 906. During the cooling operation, the heat exchanger 910 operates as a condenser to release heat. The heat exchanger 906 operates as an evaporator to absorb heat. The air conditioner 920 cools the room through the heat absorption of the heat exchanger 906. The expansion valve 908 depressurizes and expands the refrigerant.

The blower 912 attached to the heat exchanger 906 provides the heat exchanger 906 with the air supply by generating a flow of air around the heat exchanger 906. An open arrow shown next to the blower 912 in FIG. 1 represents an example of a direction of the air flow generated by the operation of the blower 912. The refrigeration cycle apparatus 900 promotes the heat exchange of the heat exchanger 906 by providing the heat exchanger 906 with the air supply.

The blower 914 attached to the heat exchanger 910 provides the heat exchanger 910 with the air supply by generating a flow of air around the heat exchanger 910. An open arrow shown next to the blower 914 in FIG. 1 represents an example of a direction of the air flow generated by the operation of the blower 914. The refrigeration cycle apparatus 900 promotes the heat exchange of the heat exchanger 910 by providing the heat exchanger 910 with the air supply.

The motor 7 is a drive source for the compressor 904 and is controlled by the motor drive apparatus 2. The motor drive apparatus 2 performs variable speed control on the motor 7. A motor serving as a drive source for the blower 912 and a motor serving as a drive source for the blower 914 are controlled by the motor drive apparatus 2. The motor drive apparatus 2 performs variable speed control on each of the motors for the blowers 912 and 914. The motors for the blowers 912 and 914 are not illustrated in FIG. 1.

Figure 2:
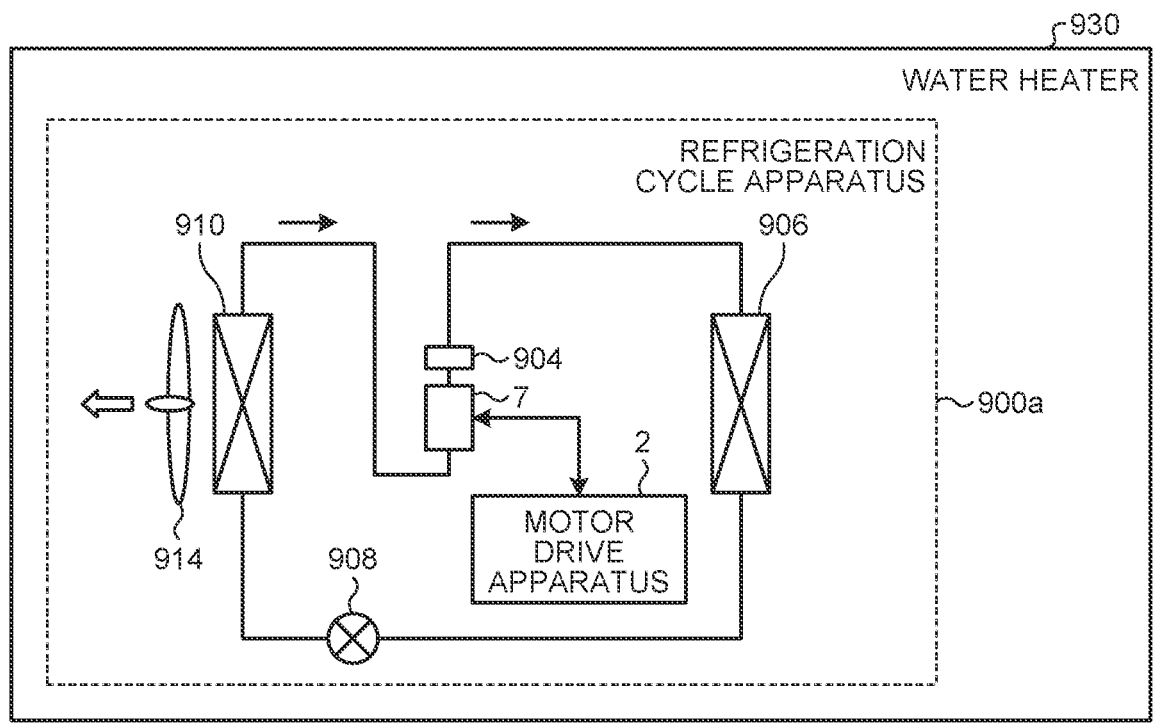
FIG. 2 is a schematic diagram of a water heater including the motor drive apparatus according to the first embodiment.

FIG. 2 is a schematic diagram of a water heater 930 including the motor drive apparatus 2 according to the first embodiment. The water heater 930 is a heat pump water heater. The water heater 930 includes a refrigeration cycle apparatus 900a. The refrigeration cycle apparatus 900a includes the compressor 904, the heat exchangers 906 and 910, the blower 914, the expansion valve 908, and the motor drive apparatus 2. In the refrigeration cycle apparatus 900a, a refrigerant discharged from the compressor 904 flows in a direction indicated by arrows in FIG. 2.

In the refrigeration cycle apparatus 900a, the heat exchanger 906 operates as a condenser to release heat. The water heater 930 heats up water through the heat release of the heat exchanger 906. The heat exchanger 910 operates as an evaporator to absorb heat. The motor 7 is controlled by the motor drive apparatus 2. A motor for the blower 914 is controlled by the motor drive apparatus 2. The motor for the blower 914 is not illustrated in FIG. 2.

Figure 3:
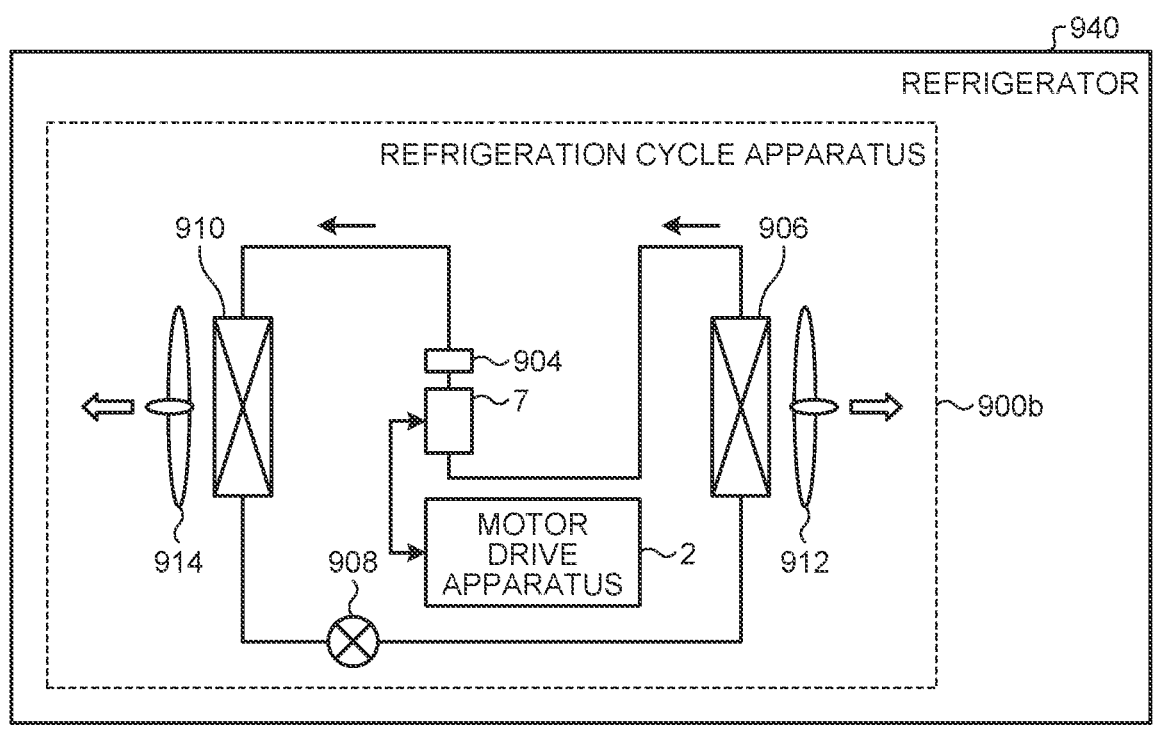
FIG. 3 is a schematic diagram of a refrigerator including the motor drive apparatus according to the first embodiment.

FIG. 3 is a schematic diagram of a refrigerator 940 including the motor drive apparatus 2 according to the first embodiment. The refrigerator 940 includes a refrigeration cycle apparatus 900*b*. The refrigeration cycle apparatus 900*b* includes the compressor 904, the heat exchangers 906 and 910, the blowers 912 and 914, the expansion valve 908, and the motor drive apparatus 2. In the refrigeration cycle apparatus 900*b*, a refrigerant discharged from the compressor 904 flows in a direction indicated by arrows in FIG. 3.

In the refrigeration cycle apparatus 900*b*, the heat exchanger 910 operates as a condenser to release heat. The heat exchanger 906 operates as an evaporator to absorb heat. The refrigerator 940 cools its compartment through the heat absorption of the heat exchanger 906. The motor 7 is controlled by the motor drive apparatus 2. Motors for the blowers 912 and 914 are controlled by the motor drive apparatus 2. The motors for the blowers 912 and 914 are not illustrated in FIG. 3.

Figure 4:
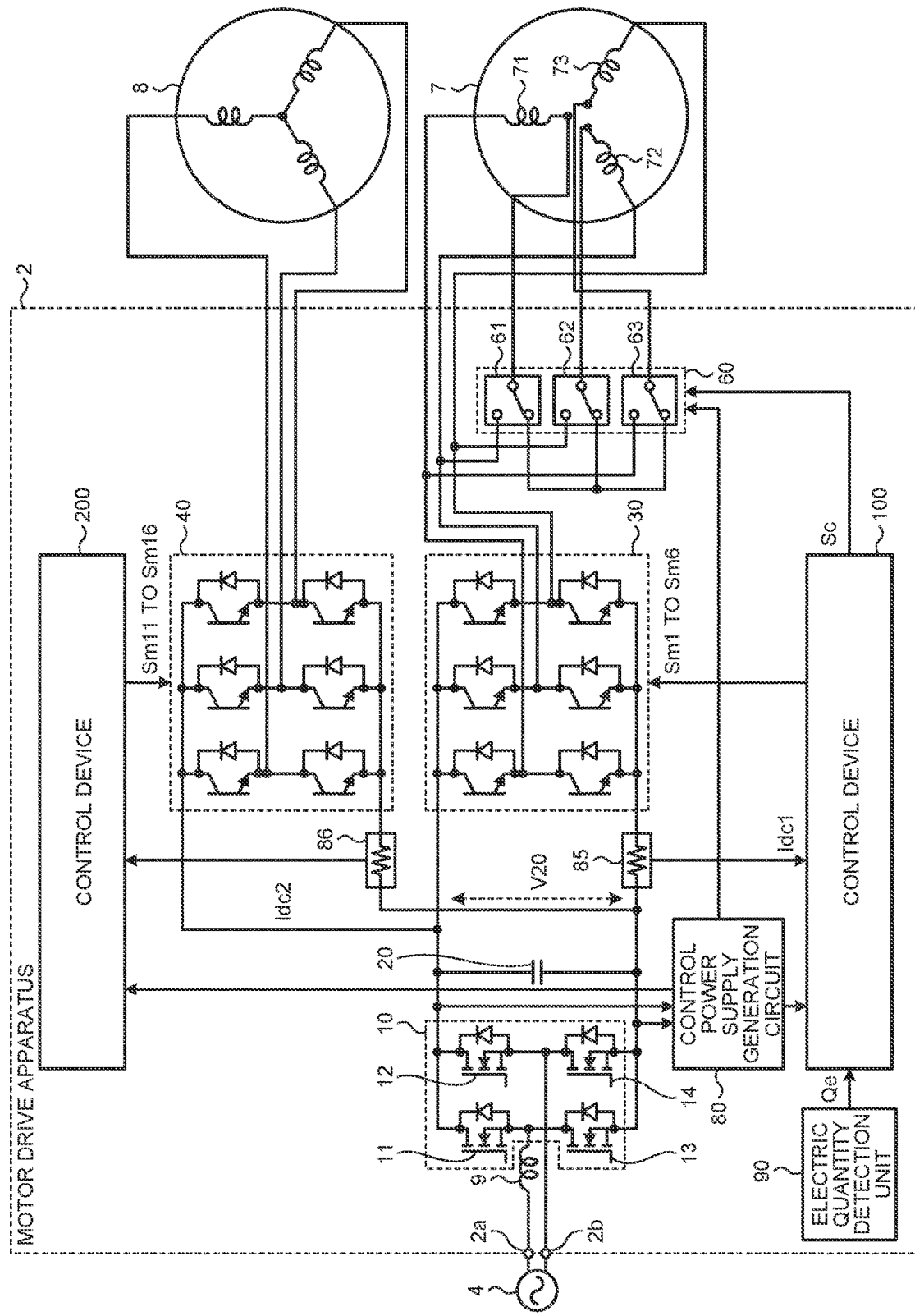
FIG. 4 is a diagram illustrating a configuration example of the motor drive apparatus according to the first embodiment.

Next, a description is provided of the motor drive apparatus 2 according to the first embodiment. FIG. 4 is a diagram illustrating a configuration example of the motor drive apparatus 2 according to the first embodiment. A wiring diagram is illustrated in FIG. 4, including the motor drive apparatus 2, the motors 7 and 8, and an alternating-current power supply 4. The motor drive apparatus 2 controls the motor 7, which is a first motor, and a motor 8, which is a second motor. The motor 8 is the motor for the blower 914. In the first embodiment, the motor drive apparatus 2 in the refrigeration cycle apparatus 900 of FIG. 1 is used as an example for the description of the configuration of the motor drive apparatus 2. A description of the motor for the blower 912 is the same as a description of the motor 8 and is therefore omitted in the first embodiment.

The motor drive apparatus 2 includes a connection switching device 60 that switches a connection state of windings 71, 72, and 73 of the motor 7; an inverter 30 that applies an alternating-current voltage to the motor 7 via the connection switching device 60; an inverter 40 that applies an alternating-current voltage to the motor 8; a control device 100 serving as a first control device; and a control device 200 serving as a second control device. The motor drive apparatus 2 also includes input terminals 2*a* and 2*b* connected to the alternating-current power supply 4; a reactor 9; a converter 10; a capacitor 20; a control power supply generation circuit 80; bus current detection means 85 and 86; and an electric quantity detection unit 90.

The connection switching device 60 includes three switches 61, 62 and 63. Each of the switches 61, 62, and 63 is a switch circuit. Each of the switches 61, 62, and 63 includes, for example, a mechanical relay. Through switching operation of the switches 61, 62, and 63 during rotation operation of the motor 7, the connection switching device 60 switches the connection state of the windings 71, 72, and 73 of the motor 7. The windings 71, 72, and 73 refer to stator windings corresponding to a U phase, a V phase, and a W phase, respectively.

The inverter 30 applies the alternating-current voltage to the windings 71, 72, and 73 via the switches 61, 62, and 63. During the rotation operation of the motor 7, a counter-electromotive voltage from the windings 71, 72, and 73 is applied to the inverter 30 via the switches 61, 62, and 63.

The control device 100 controls the inverter 30, thus controlling the motor 7. The control device 100 also controls the connection switching device 60. The inverter 40 applies the alternating-current voltage to windings of the motor 8.

The control device 200 controls the inverter 40, thus controlling the motor 8. The control power supply generation circuit 80 outputs power that is required by each of the control devices 100 and 200.

Control that the control device 100 performs when switching the connection state of the windings 71, 72, and 73 includes a first stage and a second stage. The first stage includes a current control period Pc during which an effective value of alternating current to flow through the windings 71, 72, and 73 is brought close to zero compared to an effective value of alternating current that has flowed through the windings 71, 72, and 73 before the connection state is switched. The second stage includes a power supply stop period during which the output of the alternating-current voltage from the inverter 30 is stopped. In the second stage, the control device 100 causes the switching operation of the switches 61, 62, and 63. For the motor 7 that is used in the compressor 904 of the air conditioner 920, the water heater 930, or the refrigerator 940, the current control period Pc can be set within 1 second. Moreover, the current control period Pc can be set in a range of several milliseconds to 1 second, inclusive.

As a heat load of the refrigeration cycle apparatus 900 increases, a load corresponding to the heat load is applied to the motor 7. The heat load varies depending on whether or not the blower 914 generates the air flow or strength of the air flow that the blower 914 generates. For this reason, the blower 914 is an element that can be a factor causing variations in the load on the motor 7 and thus can be said to be the element affecting the load on the motor 7. The element that affects the load on the motor 7 is hereinafter referred to as the load varying element. The motor 8 is the drive source for the load varying element. The control device 200 causes the motor 8 to run at least for a period including the first stage and the second stage.

The motor 7 is a three-phase permanent-magnet synchronous motor. Ends of the windings 71, 72, and 73 are drawn to the outside of the motor 7 to enable switching to a star connection or a delta connection. In the first embodiment, the connection state of the windings 71, 72, and 73 refers to a wiring configuration state of the windings 71, 72, and 73. Switching the connection state refers to switching the wiring configuration state of the windings 71, 72, and 73 to the star connection or the delta connection. The star connection is hereinafter referred to as "the Y connection", and the delta connection is hereinafter referred to as "the Δ connection". The connection switching device 60 switches the connection state of the windings 71, 72, and 73. The windings 71, 72, and 73 may be configured in three or more types of wiring configuration states. The connection state of the windings 71, 72, and 73 may refer to the number of turns of the windings 71, 72, and 73. Switching the connection state may refer to changing the number of turns of the windings 71, 72, and 73.

Each of the windings 71, 72, and 73 may be a winding including two or more winding sections. The winding section is a section wound with a conducting wire. In this case, each winding section of each of the windings 71, 72, and 73 has ends drawn to the outside of the motor 7 to enable the wiring configuration state to be switched. The connection switching device 60 is also applicable to a motor 7 that allows connection between winding sections to be switched between a parallel connection and a series connection.

Figure 5:
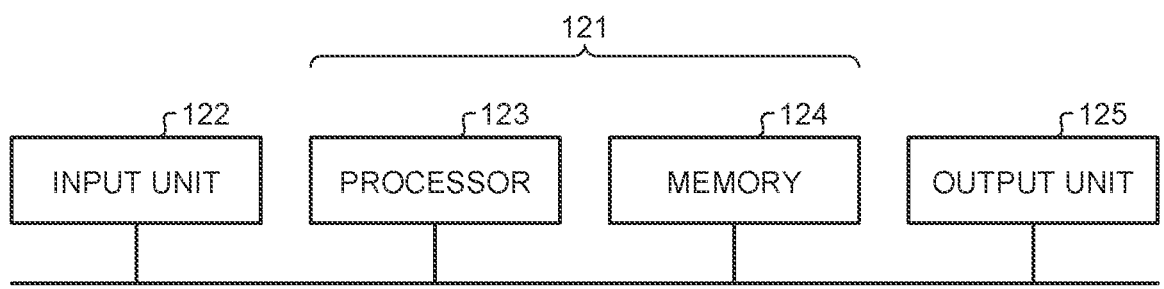
FIG. 5 is a diagram illustrating a first configuration example of hardware that implements a control device according to the first embodiment.

FIG. 5 is a diagram illustrating a first configuration example of hardware that implements the control device 100 according to the first embodiment. The first configuration example is a configuration example for essential units of the control device 100 to be implemented with processing circuitry 121 that includes a processor 123 and a memory 124. A description of the essential units of the control device 100 is provided later.

The processor 123 is a central processing unit (CPU). The processor 123 executes a control program. The control program is a program describing processing for the processor 123 to operate as the essential units of the control device 100. The memory 124 is, for example, a nonvolatile or volatile semiconductor memory such as a random-access memory (RAM), a read-only memory (ROM), a flash memory, an erasable programmable read-only memory (EPROM), or an electrically erasable programmable read-only memory (EEPROM) (registered trademark). The memory 124 stores the control program. The memory 124 is also used as a temporary memory when the processor 123 performs various processes. The processing circuitry 121 is a microcomputer or a digital signal processor (DSP) and includes the processor 123 as an information processing unit and the memory 124 as a storage unit. An input unit 122 is a circuit that receives input signals for the control device 100 from external sources. An output unit 125 is a circuit that outputs signals generated by the control device 100 to devices external to the control device 100.

Figure 6:
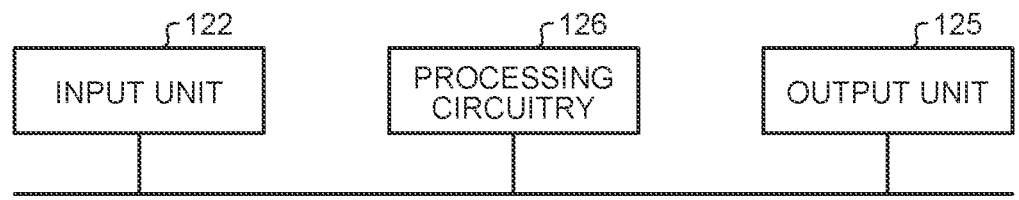
FIG. 6 is a diagram illustrating a second configuration example of the hardware that implements the control device according to the first embodiment.

The essential units of the control device 100 may be implemented with dedicated hardware. FIG. 6 is a diagram illustrating a second configuration example of the hardware that implements the control device 100 according to the first embodiment. The second configuration example is a configuration example for functions of the processing circuitry 121 illustrated in FIG. 5 to be implemented with the dedicated hardware, namely processing circuitry 126.

The processing circuitry 126 is, for example, an application-specific integrated circuit (ASIC), a field-programmable gate array (FPGA), or circuitry having these in combination. While FIG. 6 illustrates an example of implementing the essential units of the control device 100 with the single processing circuitry 126, this is not limiting. The hardware may include a plurality of the processing circuitries 126, and the essential units of the control device 100 may be implemented respectively with the separate processing circuitries 126. Some of the essential units of the control device 100 may be implemented with the processor 123 and the memory 124, which are illustrated in FIG. 5, with a remaining unit or remaining units implemented with dedicated hardware that is the same as the processing circuitry 126.

The control device 100 is assumed below to be implemented with the microcomputer, which is the processing circuitry 121 illustrated in FIG. 5. The control device 200 can use the same hardware as the control device 100.

The input terminals 2a and 2b illustrated in FIG. 4 are connected to the alternating-current power supply 4 external to the motor drive apparatus 2. An alternating-current voltage output from the alternating-current power supply 4 is applied to the input terminals 2a and 2b. An amplitude, namely an effective value of voltage to be applied is, for example, 100 V, 200 V, or another value. The voltage to be applied has a frequency of, for example, 50 Hz or 60 Hz.

The converter 10 receives alternating-current power from the alternating-current power supply 4 via the input terminals 2a and 2b and the reactor 9 and generates a direct-current voltage by rectification and boosting. The converter 10 is a circuit including switching elements 11, 12, 13, and 14. Each of the switching elements 11, 12, 13, and 14 includes a metal-oxide-semiconductor field-effect transistor (MOSFET) and a diode connected in antiparallel with the MOSFET. The term "antiparallel" means that a cathode of the diode is connected to a drain of the MOSFET, while an anode of the diode is connected to a source of the MOSFET. Parasitic diodes internal to the MOSFETs may be used as the diodes of the switching elements 11, 12, 13, and 14. The parasitic diode is also called the body diode.

The capacitor 20 smooths out the direct-current voltage generated by the converter 10 and outputs the direct-current voltage V20.

Figure 7:
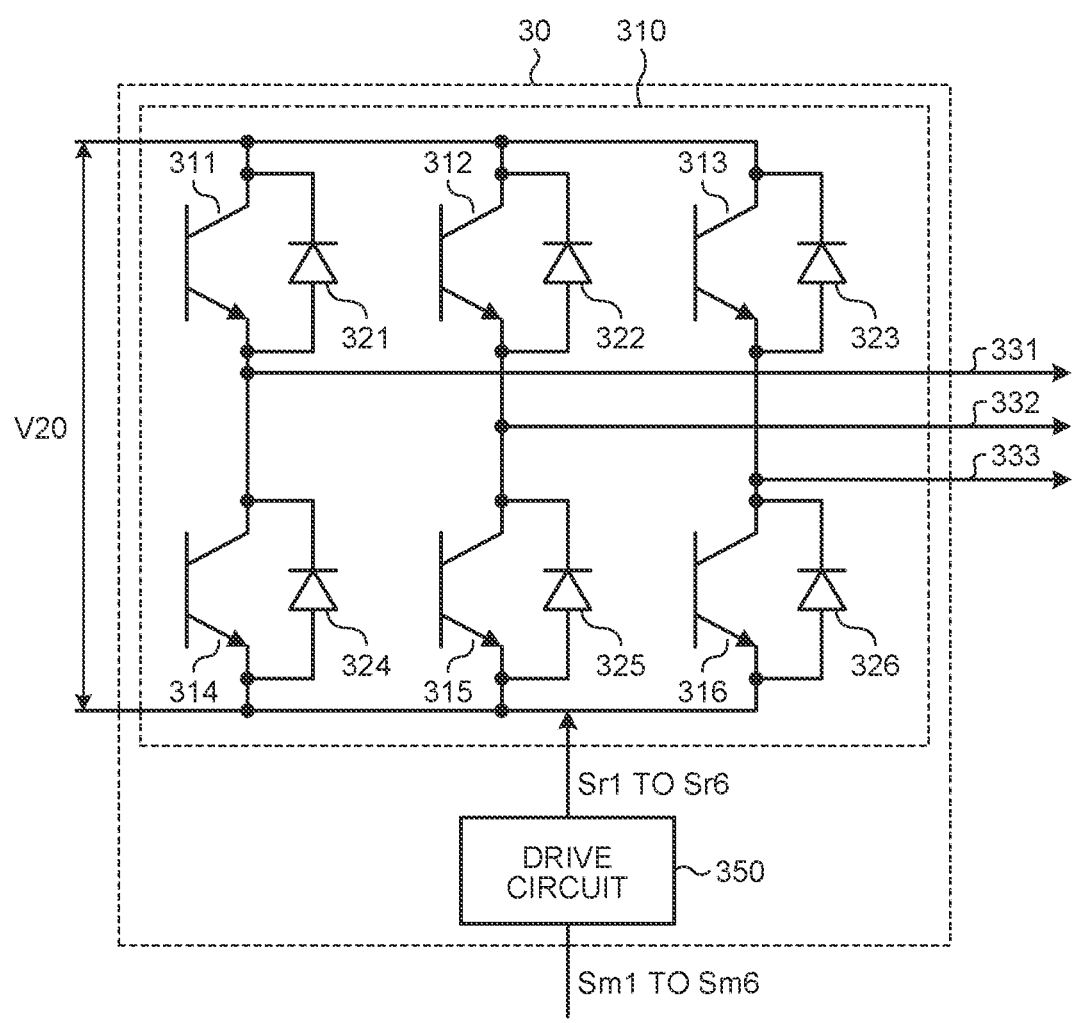
FIG. 7 is a diagram illustrating a configuration of an inverter included in the motor drive apparatus according to the first embodiment.

FIG. 7 is a diagram illustrating a configuration of the inverter 30 included in the motor drive apparatus 2 according to the first embodiment. The inverter 30 includes an inverter main circuit 310 and a drive circuit 350. An input terminal of the inverter main circuit 310 is connected to an electrode of the capacitor 20. A line connecting the output of the converter 10, those electrodes of the capacitor 20, and the input terminal of the inverter main circuit 310 is referred to as a direct-current bus.

The inverter 30 is controlled by the control device 100. Under the control of the control device 100, switching elements 311, 312, 313, 314, 315, and 316 of six arms of the inverter main circuit 310 turn on and off. Through this on-off operation, the inverter 30 generates a frequency-variable and voltage-variable three-phase alternating current and supplies the three-phase alternating current to the motor 7. The switching elements 311, 312, 313, 314, 315, and 316 are connected in parallel with freewheeling rectifier elements 321, 322, 323, 324, 325, and 326, respectively. The inverter 40 has the same configuration as the inverter 30.

Figure 8:
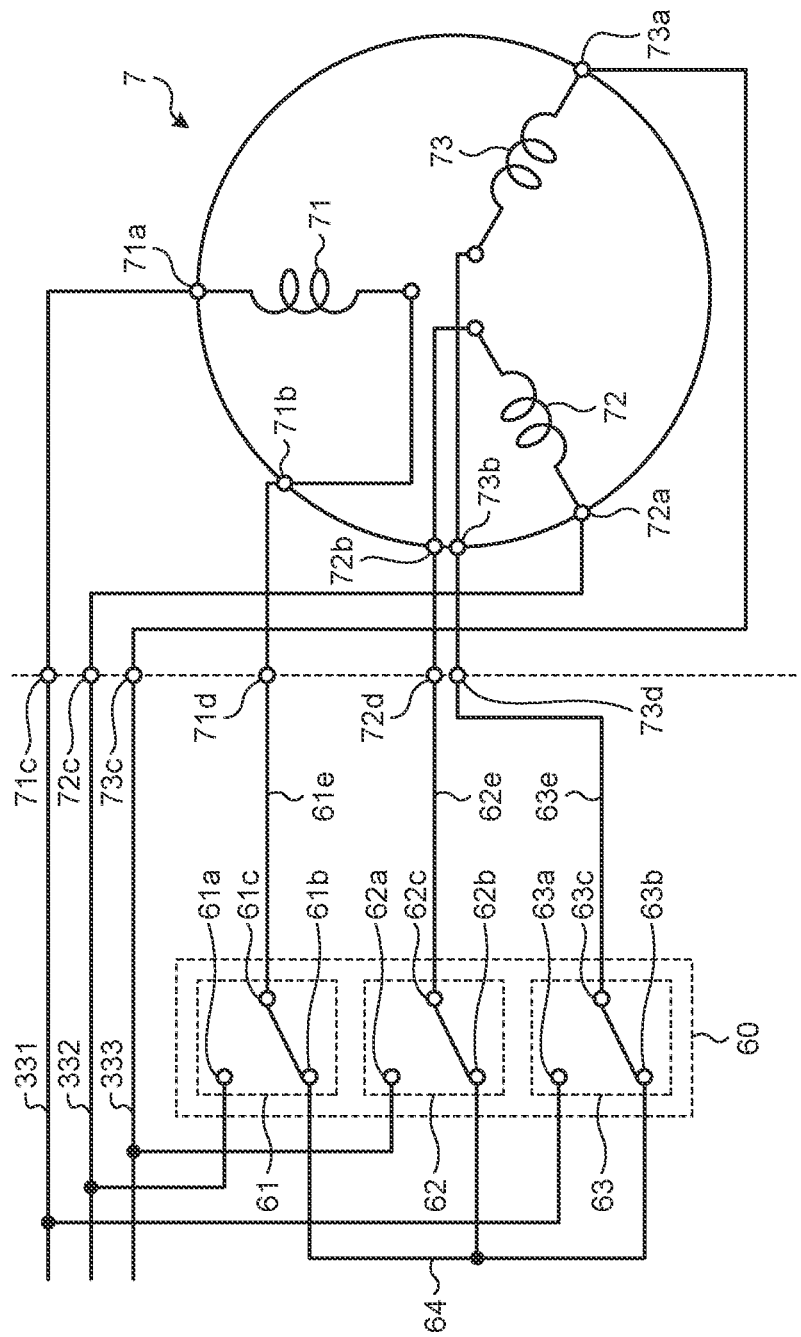
FIG. 8 is a wiring diagram according to the first embodiment, illustrating stator windings of a motor and a connection switching device.

FIG. 8 is a wiring diagram according to the first embodiment, illustrating the stator windings of the motor 7 and the connection switching device 60. The first ends 71a, 72a, and 73a of the windings 71, 72, and 73 are connected respectively to external terminals 71c, 72c, and 73c of the connection switching device 60. The second ends 71b, 72b, and 73b of the windings 71, 72, and 73 are connected respectively to external terminals 71d, 72d, and 73d of the connection switching device 60. In this way, the motor 7 is connectable to the connection switching device 60. Moreover, a U-phase, a V-phase, and a W-phase output lines 331, 332, and 333 of the inverter 30 are connected respectively to the external terminals 71c, 72c, and 73c of the connection switching device 60.

FIG. 8 illustrates an example in which the connection switching device 60 includes the three switches 61, 62, and 63. As the switches 61, 62, and 63, electromagnetic contactors whose contacts are electromagnetically opened and closed are used. Such electromagnetic contactors include ones referred to as relays, contactors, or the likes.

Figure 9:
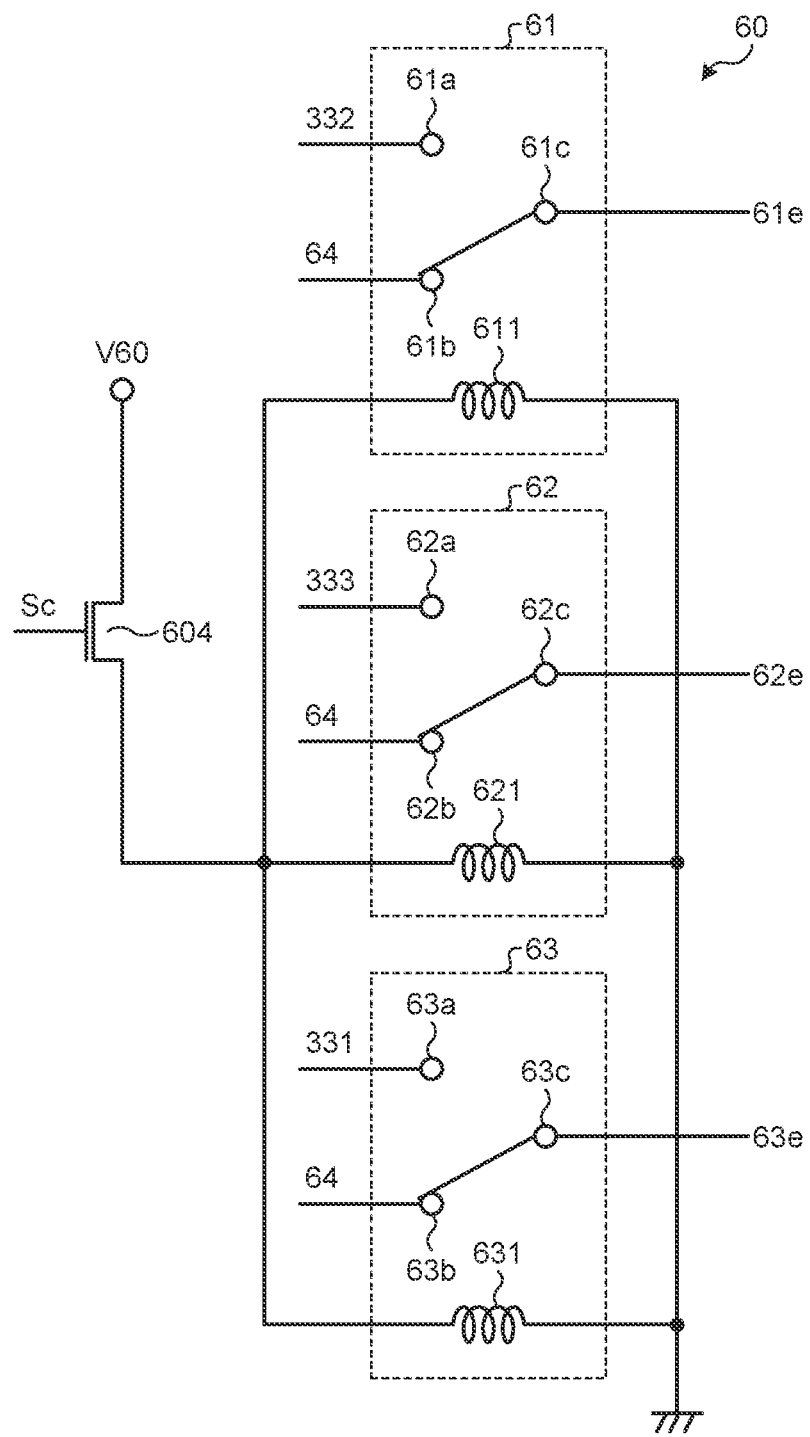
FIG. 9 is a wiring diagram illustrating a configuration example of switches included in the connection switching device illustrated in FIG. 8.

FIG. 9 is a wiring diagram illustrating a configuration example of the switches 61, 62, and 63 included in the connection switching device 60 illustrated in FIG. 8. In the example illustrated in FIG. 9, the switches 61, 62, and 63 make the wiring configuration states that differ depending on whether or not current flows through excitation coils 611, 621, and 631. The excitation coils 611, 621, and 631 are connected to each other to receive a switching power supply voltage V60 via a semiconductor switch 604. The semiconductor switch 604 turns on and off under control of a switching control signal Sc output from the control device 100. In cases where a sufficient current supply from the microcomputer included in the control device 100 is ensured, the excitation coils 611, 621, and 631 of the connection switching device 60 may be supplied with the current directly from the microcomputer.

The switch 61 has a common contact 61c connected to the external terminal 71d via a lead wire 61e. A normally closed contact 61b is connected to a neutral-point node 64, and a normally open contact 61a is connected to the V-phase output line 332 of the inverter 30.

The switch 62 has a common contact 62c connected to the external terminal 72d via a lead wire 62e. A normally closed contact 62b is connected to the neutral-point node 64, and a normally open contact 62a is connected to the W-phase output line 333 of the inverter 30.

The switch 63 has a common contact 63c connected to the external terminal 73d via a lead wire 63e. A normally closed contact 63b is connected to the neutral-point node 64, and a normally open contact 63a is connected to the U-phase output line 331 of the inverter 30.

When no current flows through the excitation coils 611, 621, and 631, the switches 61, 62, and 63 put into a state of being switched to normally closed contact sides, as illustrated in FIG. 9. In other words, the common contacts 61c, 62c, and 63c put into the state of being connected to the normally closed contacts 61b, 62b, and 63b, respectively. In this case, the wiring configuration state of the motor 7 is the Y connection.

When the current flows through the excitation coils 611, 621, and 631, the switches 61, 62, and 63 put into a state of being switched to normally open contact sides, the state opposite to that illustrated in FIG. 9. In other words, the common contacts 61c, 62c, and 63c put into the state of being connected to the normally open contacts 61a, 62a, and 63a, respectively. In this case, the wiring configuration state of the motor 7 is the Δ connection.

Figure 10:
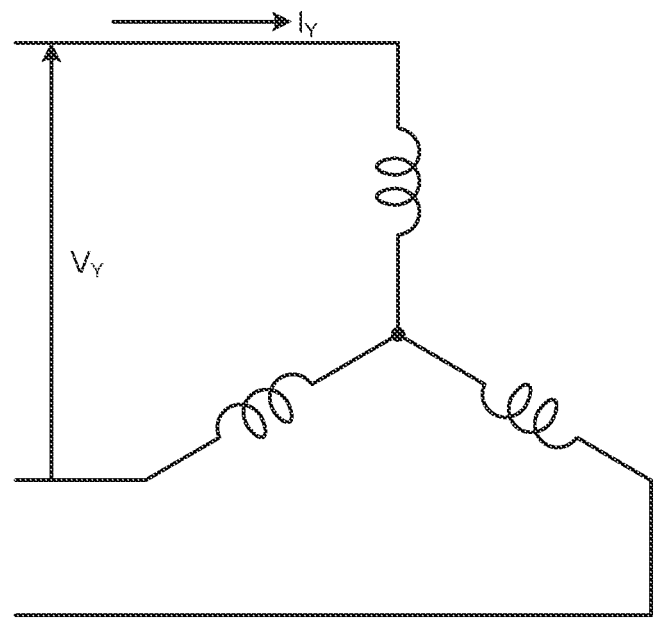
FIG. 10 is a diagram explaining a connection of the windings according to the first embodiment when a wiring configuration state of the motor is a Y connection.
Figure 11:
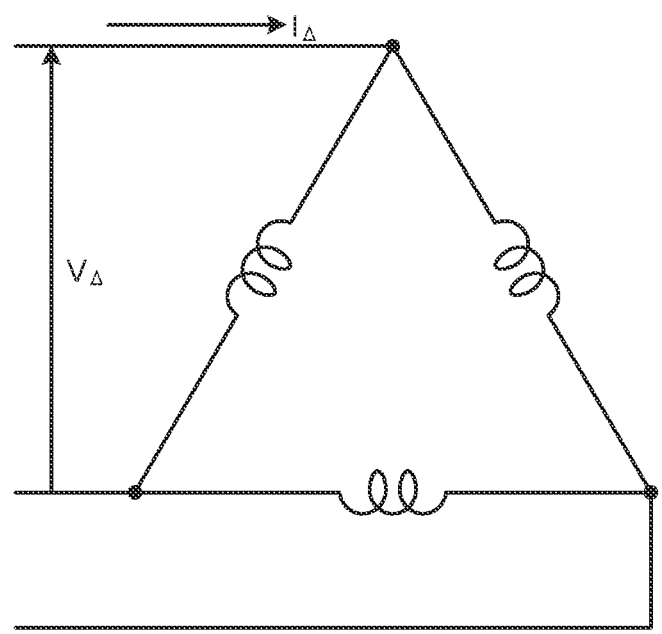
FIG. 11 is a diagram explaining a connection of the windings according to the first embodiment when the wiring configuration state of the motor is a Δ connection.

A description is provided here of advantages of using the motor 7 that allows the wiring configuration state to be switched between the Y connection and the Δ connection. FIG. 10 is a diagram explaining a connection of the windings 71, 72, and 73 according to the first embodiment when the wiring configuration state of the motor 7 is the Y connection. FIG. 11 is a diagram explaining a connection of the windings 71, 72, and 73 according to the first embodiment when the wiring configuration state of the motor 7 is the Δ connection.

Let $V_Y$ be a line voltage in the Y connection, and let $I_Y$ be the current that flows into the windings 71, 72, and 73 in the Y connection. Let $V_\Delta$ be the line voltage in the Δ connection, and let $I_\Delta$ be the current that flows into the windings 71, 72, and 73 in the Δ connection. When voltages applied to the phase windings 71, 72, and 73 are equal, relations expressed by following Formulas (1) and (2) hold.

$$V_\Delta = V_Y/\sqrt{3} \qquad (1)$$

$$I_\Delta = \sqrt{3} \times I_Y \qquad (2)$$

When the voltage $V_Y$ from the Y connection and the voltage $V_\Delta$ from the Δ connection have the relation expressed by Formula (1), with the current $I_Y$ from the Y connection and the current $I_\Delta$ from the Δ connection having the relation expressed by Formula (2), power to be supplied to the motor 7 in the Y connection is equal to power to be supplied to the motor 7 in Δ connection. In other words, when the power supplied to the motor 7 is equal in the Y and Δ connections, the current is greater in the Δ connection than that in the Y connection, and the voltage required for driving the motor 7 is lower in the Δ connection than that in the Y connection.

Utilizing the above properties, it can be considered that the motor drive apparatus 2 selects the wiring configuration state according to, for example, a load condition. For example, the motor drive apparatus 2 conceivably runs the motor 7 at a lower speed in the Y connection when the load is lower, and the motor drive apparatus 2 conceivably runs the motor 7 at a higher speed in the Δ connection when the load is higher. In this way, the motor drive apparatus 2 provides improved efficiency when the load is lower and enables increased output when the load is higher.

A more detailed description is provided of the selection of the wiring configuration state of the motor 7 that drives the compressor 904. As the motor 7 that drives the compressor 904 of the air conditioner 920, the synchronous motor with permanent magnets in a rotor is widely used to meet a demand for energy saving. The recent air conditioner 920 quickly brings room temperature closer to a set temperature by higher-speed operation that causes the motor 7 to rotate at a higher speed when the room temperature greatly differs from the set temperature and maintains the room temperature by lower-speed operation that causes the motor 7 to rotate at a lower speed when the room temperature is close to the set temperature. In cases where the motor 7 is controlled thus, a proportion of lower-speed operation time to total operation time is large.

In cases where the synchronous motor is used, as the rotational speed increases, counter-electromotive force increases, and the voltage required for driving increases in value. The rotational speed refers to the number of revolutions per unit time. The counter-electromotive force as described above is higher in the Y connection than in the Δ connection.

To reduce the counter-electromotive force at the higher speed, reducing magnetic force of the permanent magnets or reducing the number of turns of the stator windings is conceivable. However, with such measures, increased current is required to produce the same output torque. Therefore, the increased current flows through the motor 7 and the inverter 30, causing a decrease in efficiency.

Therefore, switching the wiring configuration state based on the rotational speed is conceivable. For example, when the higher-speed operation is required, the wiring configuration state is set to the Δ connection. In this way, the voltage required for driving can be $1/\sqrt{3}$ of that in the Y connection. For this reason, there is no need to reduce the number of turns of the stator windings or use flux weakening control.

On the other hand, setting the wiring configuration state to the Y connection at the lower-speed rotation enables the current to be $1/\sqrt{3}$ of that in the Δ connection in value. Moreover, designing of the stator windings that is suitable for the lower-speed rotation in the Y connection is possible in the motor 7, enabling the current to be reduced in value compared to when the wiring configuration state is the Y connection over an entire speed range. As a result, the motor 7 can reduce loss of the inverter 30 and improve the efficiency.

As described above, switching the wiring configuration state based on the load condition is meaningful, and the connection switching device 60 is provided to allow for such switching.

The bus current detection means 85 illustrated in FIG. 4 detects a bus current, that is to say, a direct current Idc1 input to the inverter 30. The bus current detection means 85 includes a shunt resistor inserted in the direct-current bus and supplies the control device 100 with an analog signal indicating a result of the detection of the direct current Idc1. The analog signal indicating the detection result is converted by an analog-to-digital (A/D) converter in the control device 100 into a digital signal to be used in internal processing of the control device 100.

The bus current detection means 86 detects a direct current Idc2 input to the inverter 40. The bus current detection means 86 includes a shunt resistor inserted in a direct-current bus and supplies the control device 200 with an analog signal that is a signal indicating a result of the detection of the direct current Idc2. The analog signal indicating the detection result is converted by an A/D converter in the control device 200 into a digital signal to be used in internal processing of the control device 200. The A/D converters of the control devices 100 and 200 are not illustrated.

As described above, the control device 100 controls the wiring configuration state switching performed by the connection switching device 60 and also controls the operation of the inverter 30. The control device 100 generates and supplies the inverter 30 with pulse-width modulation (PWM) signals Sm1 to Sm6 that are equal in number to the switching elements 311 to 316 for controlling the inverter 30. Similarly, the control device 200 performs operation control on the inverter 40. The control device 200 generates and supplies the inverter 40 with PWM signals Sm11 to Sm16 that are equal in number to switching elements inside the inverter 40 for controlling the inverter 40.

As illustrated in FIG. 7, the inverter 30 includes the drive circuit 350 in addition to the inverter main circuit 310. The drive circuit 350 generates drive signals Sr1 to Sr6 based on the PWM signals Sm1 to Sm6. With the drive signals Sr1 to Sr6, the drive circuit 350 controls the on-off operation of the switching elements 311 to 316. In this way, the frequency-variable and voltage-variable three-phase alternating-current voltage is applied to the motor 7.

The PWM signals Sm1 to Sm6 are signals having signal levels of a logic circuit, namely levels ranging from 0 V to 5 V, inclusive. The PWM signals Sm1 to Sm6 are the signals that use a ground potential of the control device 100 as a reference potential. On the other hand, the drive signals Sr1 to Sr6 are signals having voltage levels that are required to control the switching elements 311 to 316, such as levels ranging from −15 V to +15 V, inclusive. The drive signals Sr1 to Sr6 are the signals that respectively use potentials of negative terminals (i.e., emitter terminals) of the corresponding switching elements as reference potentials.

As with the inverter 30, the inverter 40 generates drive signals based on the PWM signals Sm1l to Sm16 and with the drive signals, controls on-off operation of the switching elements. In this way, the frequency-variable and voltage-variable three-phase alternating-current voltage is applied to the motor 8.

Figure 12:
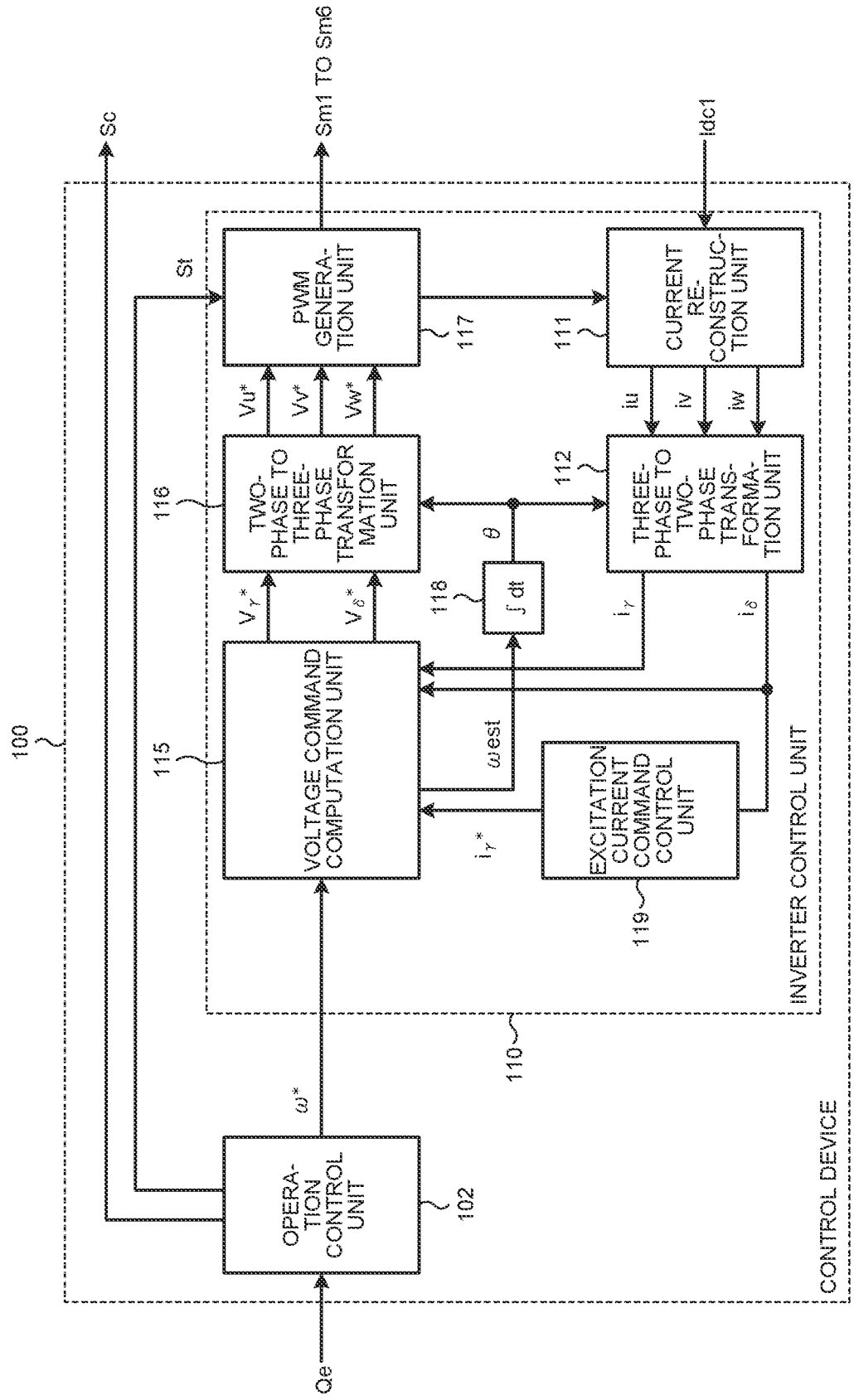
FIG. 12 is a functional block diagram illustrating a configuration example of the control device according to the first embodiment.

A description is provided next of a function configuration of the control device 100. FIG. 12 is a functional block diagram illustrating a configuration example of the control device 100 according to the first embodiment. The control device 100 includes an operation control unit 102 and an inverter control unit 110. Function parts of the control device 100 that are illustrated in FIG. 12 are the essential units of the control device 100.

The operation control unit 102 receives command information Qe provided by the electric quantity detection unit 90 illustrated in FIG. 4. When controlling the air conditioner 920, the operation control unit 102 controls parts of the air conditioner 920 based on the command information Qe. Examples of the command information Qe include the room temperature detected by a temperature sensor not illustrated and those specified from a remote controller as an operation unit not illustrated, such as information indicating the set temperature, information about a selected operation mode, and information about an operation start instruction and an operation end instruction. Examples of the operation mode include heating, cooling, and dehumidification, among others.

For example, the operation control unit 102 determines whether the stator windings of the motor 7 are to be Y-connected or Δ-connected and determines a target rotational speed. On the basis of the determinations, the operation control unit 102 outputs the switching control signal Sc and a frequency command value ω*. When, for example, the room temperature greatly differs from the set temperature, the operation control unit 102 determines to use the Δ connection. The operation control unit 102 also sets the target rotational speed at a relatively high value and outputs the frequency command value ω* that causes a frequency to gradually increase to a frequency corresponding to the above-stated target rotational speed after starting the operation. In addition, the operation control unit 102 outputs a stop signal St that stops the motor 7.

When the frequency reaches that corresponding to the target rotational speed, the operation control unit 102 maintains this state until the room temperature approaches the set temperature. When the room temperature becomes close to the set temperature, the operation control unit 102 suspends the motor 7 and outputs the switching control signal Sc to switch the wiring configuration state to the Y connection. The operation control unit 102 also outputs the frequency command value ω* that causes the frequency to gradually increase to a frequency corresponding to a relatively low target rotational speed. When the frequency reaches that corresponding to the target rotational speed, the operation control unit 102 then performs control that maintains the room temperature in a state close to the set temperature. This control includes frequency adjustment and suspending and restarting the motor, among others.

As illustrated in FIG. 12, the inverter control unit 110 includes a current reconstruction unit 111, a three-phase to two-phase transformation unit 112, a voltage command computation unit 115, a two-phase to three-phase transformation unit 116, a PWM generation unit 117, an electrical angle phase computation unit 118, and an excitation current command control unit 119.

A signal is input to the current reconstruction unit 111, indicating the value of the direct current Idc1 detected by the bus current detection means 85 illustrated in FIG. 4. On the basis of the value of the direct current Idc1, the current reconstruction unit 111 reconstructs phase currents $i_u$, $i_v$, and $i_w$ flowing in the motor 7. The current reconstruction unit 111 reconstructs the phase currents $i_u$, $i_v$, and $i_w$ by sampling the direct current Idc1 being detected by the bus current detection means 85 at a timing determined based on the PWM signals provided by the PWM generation unit 117.

Using electrical angle phase θ generated by the electrical angle phase computation unit 118, the three-phase to two-phase transformation unit 112 transforms current values of the phase currents $i_u$, $i_v$, and $i_w$ that the current reconstruction unit 111 has reconstructed to current values in a γ-δ frame. The current values in the γ-δ frame are represented by an excitation current component $i_\gamma$ as the "γ-axis current" and a torque current component $i_\delta$ as the "δ-axis current".

On the basis of the torque current component $i_\delta$, the excitation current command control unit 119 determines an optimal excitation current command value $i_\gamma^*$ for the most efficient driving of the motor 7. The excitation current command control unit 119 outputs the excitation current command value $i_\gamma^*$ which yields current phase $\beta_m$ that causes the output torque to be greater than or equal to a specified value or a maximum value, that is to say, that causes the current value to be smaller than or equal to a specified value or a minimum value. While the excitation current command control unit 119 determines the excitation current command value $i_\gamma^*$ based on the torque current component $i_\delta$ here, this is a non-limiting example. The same effect can be obtained even when the excitation current command control unit 119 determines the excitation current command value $i_\gamma^*$ based on the excitation current component $i_\gamma$, the frequency command value $\omega^*$, or another value.

On the basis of the frequency command value $\omega^*$ obtained from the operation control unit 102, the excitation current component $i_\gamma$ and the torque current component $i_\delta$ that are obtained from the three-phase to two-phase transformation unit 112, and the excitation current command value $i_\gamma$, obtained from the excitation current command control unit 119, the voltage command computation unit 115 generates a γ-axis voltage command value $V_\gamma^*$ and a δ-axis voltage command value $V_\delta^*$. The voltage command computation unit 115 also estimates the frequency of the motor 7 and outputs an estimated frequency value west. A detailed description of the voltage command computation unit 115 is provided later.

The electrical angle phase computation unit 118 computes the electrical angle phase θ by integrating the estimated frequency value west obtained from the voltage command computation unit 115.

Using the electrical angle phase θ obtained from the electrical angle phase computation unit 118, the two-phase to three-phase transformation unit 116 transforms the voltage command values $V_\gamma^*$ and $V_\delta^*$ obtained from the voltage command computation unit 115, that is to say, the voltage command values in a two-phase reference frame to three phase voltage command values $V_u^*$, $V_v^*$, and $V_w^*$ that are output voltage command values in a three-phase reference frame.

On the basis of the three phase voltage command values $V_u^*$, $V_v^*$, and $V_w^*$ obtained from the two-phase to three-phase transformation unit 116, the PWM generation unit 117 generates the PWM signals Sm1 to Sm6. The stop signal St from the operation control unit 102 is given to, for example, the PWM generation unit 117. Upon receiving the stop signal St, the PWM generation unit 117 immediately stops the output of the PWM signals Sm1 to Sm6. When the output of the PWM signals Sm1 to Sm6 is stopped, the motor 7 stops.

Figure 13:
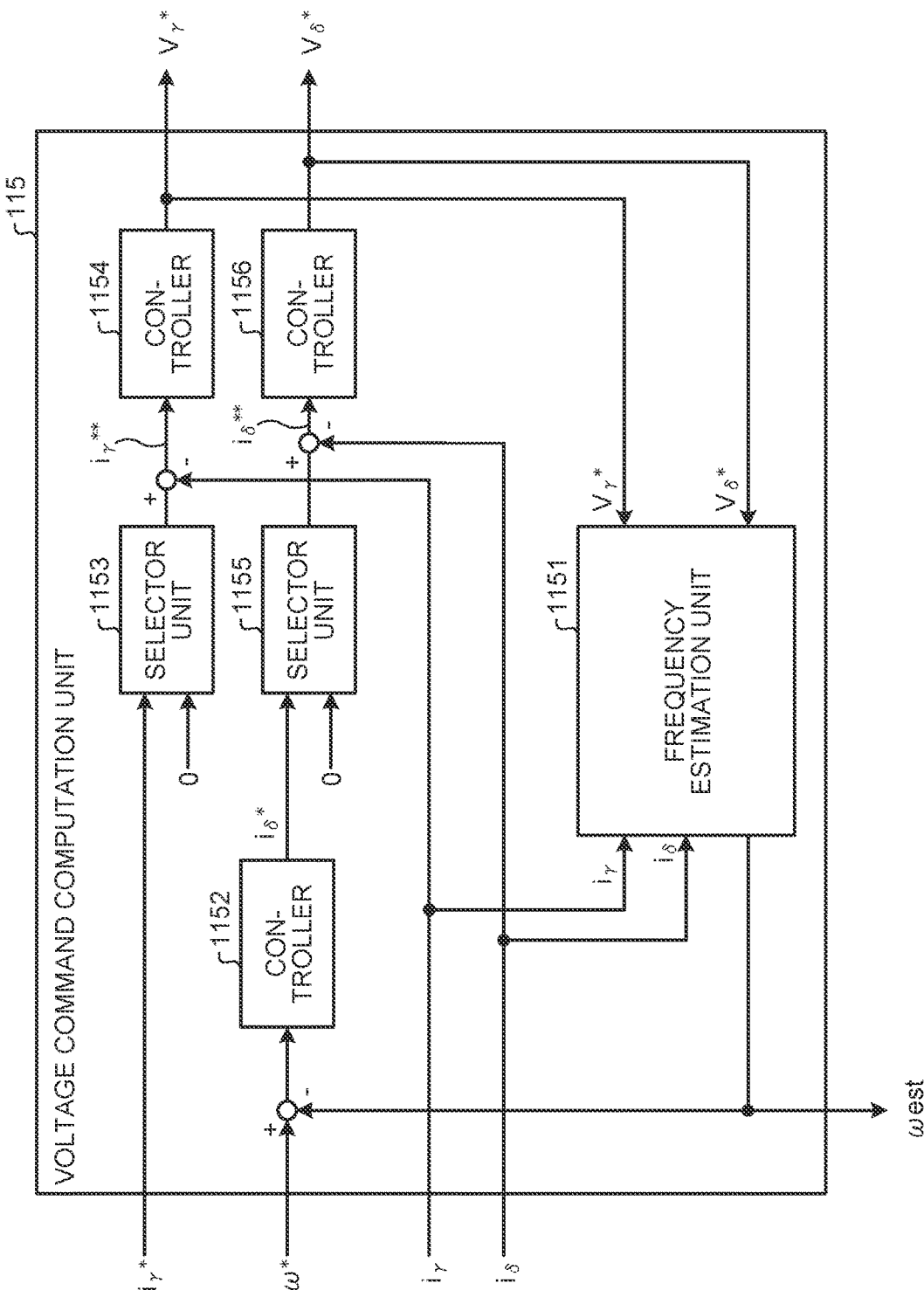
FIG. 13 is a diagram illustrating a configuration example of a voltage command computation unit included in the control device illustrated in FIG. 12.

A detailed description is provided here of a configuration and the operation of the voltage command computation unit 115. FIG. 13 is a diagram illustrating a configuration example of the voltage command computation unit 115 constituting the control device 100 illustrated in FIG. 12. A frequency estimation unit 1151 estimates the frequency of the motor 7 based on the excitation current component $i_\gamma$, the torque current component is, the γ-axis voltage command value $V_\gamma^*$, and the δ-axis voltage command value $V_\delta^*$, thus generating the estimated frequency value west.

A controller 1152 is, for example, a proportional-integral (PI) controller. On the basis of the frequency command value $\omega^*$ obtained from the operation control unit 102 and the estimated frequency value west obtained from the frequency estimation unit 1151, the controller 1152 generates a torque current command value $i_\delta^*$. For example, the controller 1152 generates, based on a difference $\omega^*$-west between the frequency command value $\omega^*$ and the estimated frequency value west, the torque current command value $i_\delta^{**}$ that causes the estimated frequency value west to equal the frequency command value $\omega^*$.

A selector unit 1155 selects a value as a torque current command value $i_\delta^{**}$ from the torque current command value $i_\delta^*$ and the value "zero". A controller 1156 is, for example, a PI controller. The controller 1156 generates the δ-axis voltage command value $V_\delta^*$ that causes the torque current component $i_\delta$ to equal the torque current command value $i_\delta^{**}$.

A selector unit 1153 selects a value as an excitation current command value $i_\gamma^{**}$ from the excitation current command value $i_\gamma^*$ and the value "zero". A controller 1154 is, for example, a PI controller. The controller 1154 generates the γ-axis voltage command value $V_\gamma^*$ that causes the excitation current component $i_\gamma$ to equal the excitation current command value $i_\gamma^{}$. The voltage command computation unit 115** outputs the generated γ-axis voltage command value $V_\gamma^*$ and the generated δ-axis voltage command value $V_\delta^*$.

In the example illustrated in FIG. 12, while the current reconstruction unit 111 of the control device 100 reconstructs the phase currents $i_u$, $i_v$, and $i_w$ based on the value of the direct current Idc1 as measured on an input side of the inverter 30, this is not limiting. For example, current detectors may be provided at the output lines 331, 332, and 333 of the inverter 30 to detect the phase currents $i_u$, $i_v$, and $i_w$. In this case, the control device 100 uses current detection results of the current detectors instead of the result of the reconstruction by the current reconstruction unit 111.

In cases where the three-phase permanent-magnet synchronous motor is used as the motor 7, a flow of overcurrent in the motor 7 causes irreversible demagnetization to the permanent magnets, resulting in a decline in magnetic force. When the magnetic force declines, it is required to increase current to generate the same torque to be output, resulting in deteriorated loss as a problem. Since the current values of the phase currents $i_u$, $i_v$, and $i_w$ or the value of the direct current Idc1 is input to the control device 100, then the overcurrent flows in the motor 7, the control device 100 stops the PWM signals Sm1 to Sm6 to stop the current flow to the motor 7. In this way, the irreversible demagnetization is preventable. The control device 100 may be provided with a low-pass filter (LPF) that removes noise signals from the direct current Idc1 to be input to the control device 100 or LPFs that remove noise signals from the phase currents $i_u$, $i_v$, and $i_w$ to be input to the control device 100. In this case, the control device 100 can prevent erroneous suspension of the PWM signals Sm1 to Sm6 due to the noise and improve operation reliability.

The currents that may cause the irreversible demagnetization in the motor 7, which allows the wiring configuration state to be switched between the Y connection and the Δ connection, namely, the current $I_Y$ illustrated in FIG. 10 and the current $I_\Delta$ illustrated in FIG. 11 are such that the current $I_\Delta$ becomes as high as √3 times the current $I_Y$. If, for this reason, a level of protection against the irreversible demagnetization is set based on the current $I_Y$ of the Y connection in the control device 100, the protection is applied earlier for the current $I_\Delta$ in the Δ connection, making it difficult for the motor 7 to have an expanded operating range. Therefore, switching is performed between a Y connection-specific protection level and a Δ connection-specific protection level in the control device 100 to enable reliable protection of the motor 7 from the irreversible demagnetization in the windings 71, 72, and 73. In this way, the motor drive apparatus 2 allows for improved reliability.

In an example, the protection level is set at a current value that is a limit within which performance is not affected when the irreversible demagnetization occurs, such as a current value for which the magnetic force that is 100% in an initial state of the motor 7 reduces to 97%. However, the current value to be set as the protection level may be appropriately changed in accordance with an apparatus in which the motor 7 is to be installed.

A description is provided next of how the motor drive apparatus 2 operates when the switching operation of the switches 61, 62, and 63 is to be done with the motor 7 running, that is to say, rotating. Before the operation according to the first embodiment is described, operation according to a general comparative example and its problems are described here.

Suppose, in the general comparative example, there is a possibility that the blower 914 illustrated in FIG. 1 stops during a switching operation period. If the switching operation is performed with the blower 914 stopped, heat exchange efficiency of the heat exchanger 910 is significantly reduced, thus causing the heat load of the refrigeration cycle apparatus 900 to be excessive. In this case, the load on the motor 7 that drives the compressor 904, too, increases.

When gates of the inverter 30 are turned off for the switching operation, a power supply to the motor 7 stops. If the load on the motor 7 is high in this case, the rotational speed of the motor 7 in inertia rotation significantly decreases. Therefore, the motor 7 experiences a delay in regaining the rotational speed after the switching operation. In this case, capacity of the refrigeration cycle apparatus 900 decreases. In another case, when the rotational speed of the motor 7 may become zero during the switching operation, there is a possibility that no connection switching is performed while the motor 7 is operating. In case of the air conditioner 920, the room temperature is increased by a decline in cooling capacity or decreased by a decline in heating capacity and thus cannot be kept constant, resulting in deteriorated comfort. With the power supply to the motor 7 stopped, a regenerative voltage is generated in association with the inertia rotation of the motor 7 and may cause a steep rise in bus voltage. The steep rise in bus voltage can cause elements in the motor drive apparatus 2 to break down due to the increased bus voltage whose influence exceeds their withstand voltages.

To prevent the switches 61, 62, and 63 from failing during the switching operation, bus voltage setting using the converter 10 for preventing a regenerative current of the motor 7 from flowing to the switches 61, 62, and 63 is possible. In this case, suspending the output of the inverter 30 in parallel with bus voltage boost control by the converter 10 can cause the load on the motor 7 to reduce suddenly. As in the above case, the bus voltage can rise steeply and cause the elements to break down due to the increased bus voltage whose influence exceeds their withstand voltages also in this case.

Figure 14:
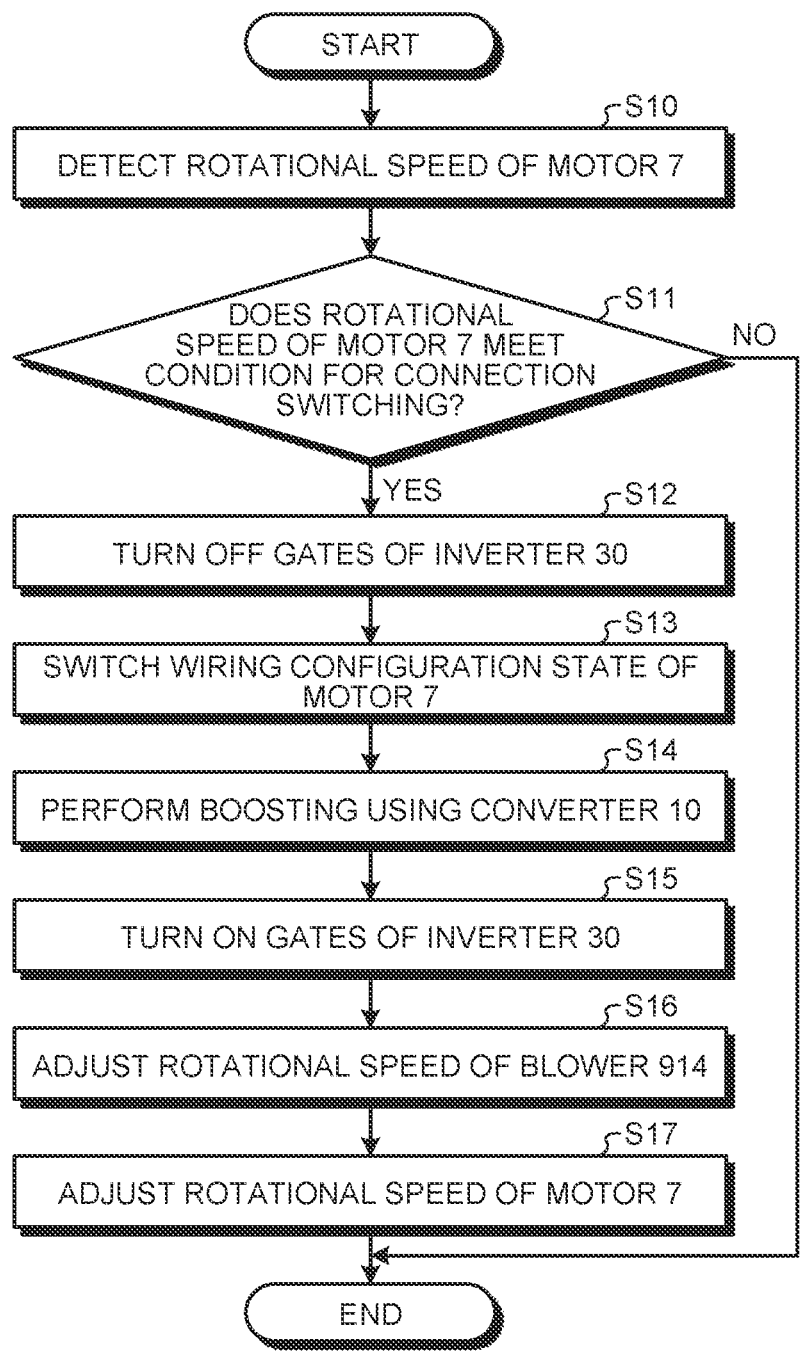
FIG. 14 is a flowchart illustrating an operational procedure for the motor drive apparatus according to the first embodiment to switch the wiring configuration state of the motor.

FIG. 14 is a flowchart illustrating an operational procedure for the motor drive apparatus 2 according to the first embodiment to switch the wiring configuration state of the motor 7. At step S10, the motor drive apparatus 2 detects the rotational speed of the motor 7.

At step S11, the motor drive apparatus 2 determines whether or not the rotational speed of the motor 7 meets a condition for the connection switching. Rotational speed thresholds RP1 and RP2 for use on switching the wiring configuration state are preset in the motor drive apparatus 2. If the current rotational speed of the motor 7 is lower than or equal to RP1, or higher than or equal to RP2, the motor drive apparatus 2 judges that the condition for the connection switching is met. If the current rotational speed of the motor 7 is higher than RP1 and lower than RP2, the motor drive apparatus 2 judges that the condition for the connection switching is not met. If the condition for the connection switching is not met (step S11, No), the motor drive apparatus 2 ends its processing based on the procedure illustrated in FIG. 14. The motor 7 keeps running, with the wiring configuration state not switched.

If the condition for the connection switching is met (step S11, Yes), the motor drive apparatus 2 turns off the gates of the inverter 30 at step S12. At step S13, the motor drive apparatus 2 switches the wiring configuration state of the motor 7.

After switching the wiring configuration state, the motor drive apparatus 2 performs boosting using the converter 10 at step S14. The motor drive apparatus 2 turns on the gates of the inverter 30 at step S15, adjusts rotational speed of the blower 914 at step S16, and then adjusts the rotational speed of the motor 7 at step S17. The motor drive apparatus 2 switches the connection state of the motor 7 thus and ends the operation based on the procedure illustrated in FIG. 14. The motor 7 keeps running, with the wiring configuration state switched.

Figure 15:
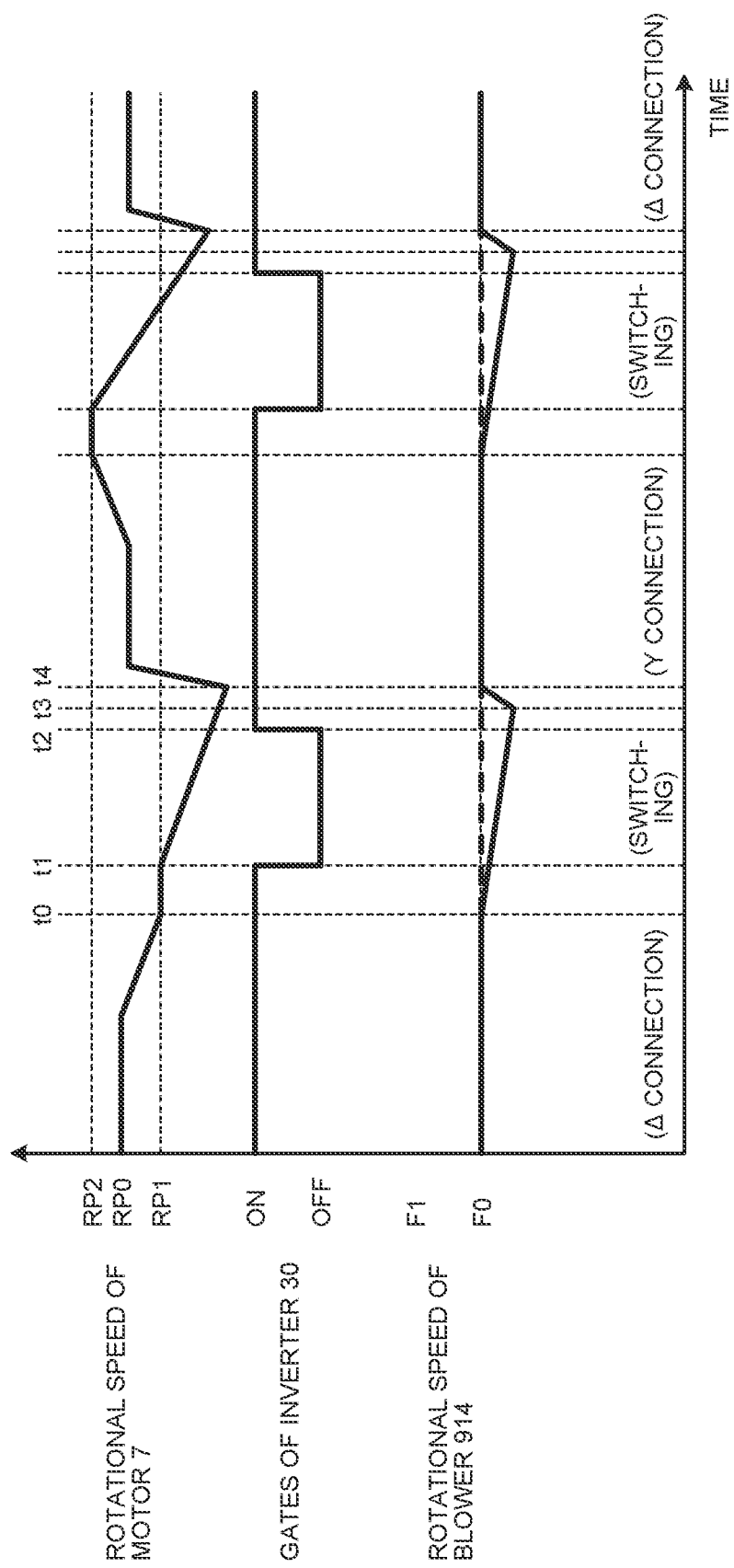
FIG. 15 is a timing chart illustrating an example of an operation of a refrigeration cycle apparatus according to the first embodiment.

FIG. 15 is a timing chart illustrating an example of an operation of the refrigeration cycle apparatus 900 in the first embodiment. t0, t1, t2, t3, and t4 respectively represent timings in a time series. In FIG. 15, the rotational speed of the blower 914 also refers to the rotational speed of the motor 8. Suppose the rotational speed of the motor 7, decreasing from RP0, becomes lower than or equal to RP1 at t0. Since the condition for the connection switching is met, the motor drive apparatus 2 turns off the gates of the inverter 30 at t1 that comes after t0.

The blower 914 is assumed to have been driven by the motor drive apparatus 2 at a rotational speed F0 through powered rotation since before the decrease of the rotational speed of the motor 7 from RP0. The motor drive apparatus 2 maintains the powered rotation of the blower 914 even after the rotational speed of the motor 7 becomes lower than or equal to RP0. Alternatively, the motor drive apparatus 2 causes the inertia rotation to the blower 914 after the rotational speed of the motor 7 starts decreasing from RP0. In both cases, even if the rotational speed of the motor 7 starts decreasing from RP0, the blower 914 continues rotating. In FIG. 15, a dashed line indicates how the rotational speed of the blower 914 changes when its rotation from t0 is the powered rotation. A solid line indicates how the rotational speed of the blower 914 changes when its rotation from t0 is the inertia rotation.

After switching the wiring configuration state of the motor 7, the motor drive apparatus 2 turns on the gates of the inverter 30 at t2. At t3 that comes after t2, the motor drive apparatus 2 adjusts the rotational speed of the blower 914. If the blower 914 is in the powered rotation, the rotational speed of the blower 914 is maintained at F0. If the blower 914 is in the inertia rotation, the motor drive apparatus 2 increases the rotational speed of the blower 914 that has reduced below F0. For both the powered rotation and the inertia rotation, the motor drive apparatus 2 keeps the blower 914, which is the load varying element, running. At t4 that comes after t3, the motor drive apparatus 2 increases the rotational speed of the motor 7 to RP0.

In cases where the rotational speed of the motor 7, increasing from RP0, becomes higher than or equal to RP2, the motor drive apparatus 2 also keeps the blower 914 running similarly to the case where the rotational speed becomes lower than or equal to RP1.

The motor drive apparatus 2 according to the first embodiment keeps the blower 914 rotating when performing the switching operation, thus allowing the heat exchange of the heat exchanger 910 to continue. Therefore, the motor drive apparatus 2 is capable of reducing the load on the motor 7 that is associated with the switching operation. The motor drive apparatus 2 allows for a shorter time for the motor 7 to regain the rotational speed. For this reason, the refrigeration cycle apparatus 900 is capable of reducing a decrease in refrigeration cycle capacity that is associated with the switching operation. The air conditioner 920 is enabled to prevent its cooling and heating capacities from decreasing and improve the comfort. Moreover, the motor drive apparatus 2 keeps the blower 914 generating the air flow, thus allowing the load to consume the bus voltage and preventing an excessive rise in bus voltage. Therefore, the motor drive apparatus 2 is capable of reducing problems such that the elements in the motor drive apparatus 2 break down due to the increased bus voltage whose influence exceeds their withstand voltages.

As a result, the motor drive apparatus 2 has an effect of preventing efficiency of the apparatus having the motor 7 from being lowered. In addition, the motor drive apparatus 2 is capable of preventing problems that might be caused by the excessive rise in bus voltage, thus achieving higher reliability.

Diodes are commonly used as the switching elements 11 to 14 of the converter 10. However, the configuration of the converter 10 is not limited to this case. For example, instead of diodes, as the switching elements 11 to 14 of the converter 10, as shown in FIG. 4, transistor elements (semiconductor switches), such as MOSFETs or other elements, may be used to perform the rectification by turning on in accordance with polarity of the supplied voltage (input alternating-current voltage) from the alternating-current power supply 4.

While insulated-gate bipolar transistors (IGBTs) or MOSFETs are used as the switching elements 311 to 316 of the inverter main circuit 310, this is not limiting in the first embodiment. Any elements may be used as the switching elements 311 to 316 as long as the elements are capable of switching. In cases where the MOSFETs are used as the switching elements 311 to 316, there is no need to connect the freewheeling rectifier elements 321 to 326 illustrated in FIG. 7 in parallel because the MOSFETs structurally includes parasitic diodes.

A material to be used for fabricating the switching elements 11 to 14 and the switching elements 311 to 316 is not limited to silicon (Si). In case of use of a wide-bandgap semiconductor such as silicon carbide (SiC), gallium nitride (GaN), or diamond, it enables further loss reduction.

Second Embodiment

Figure 16:
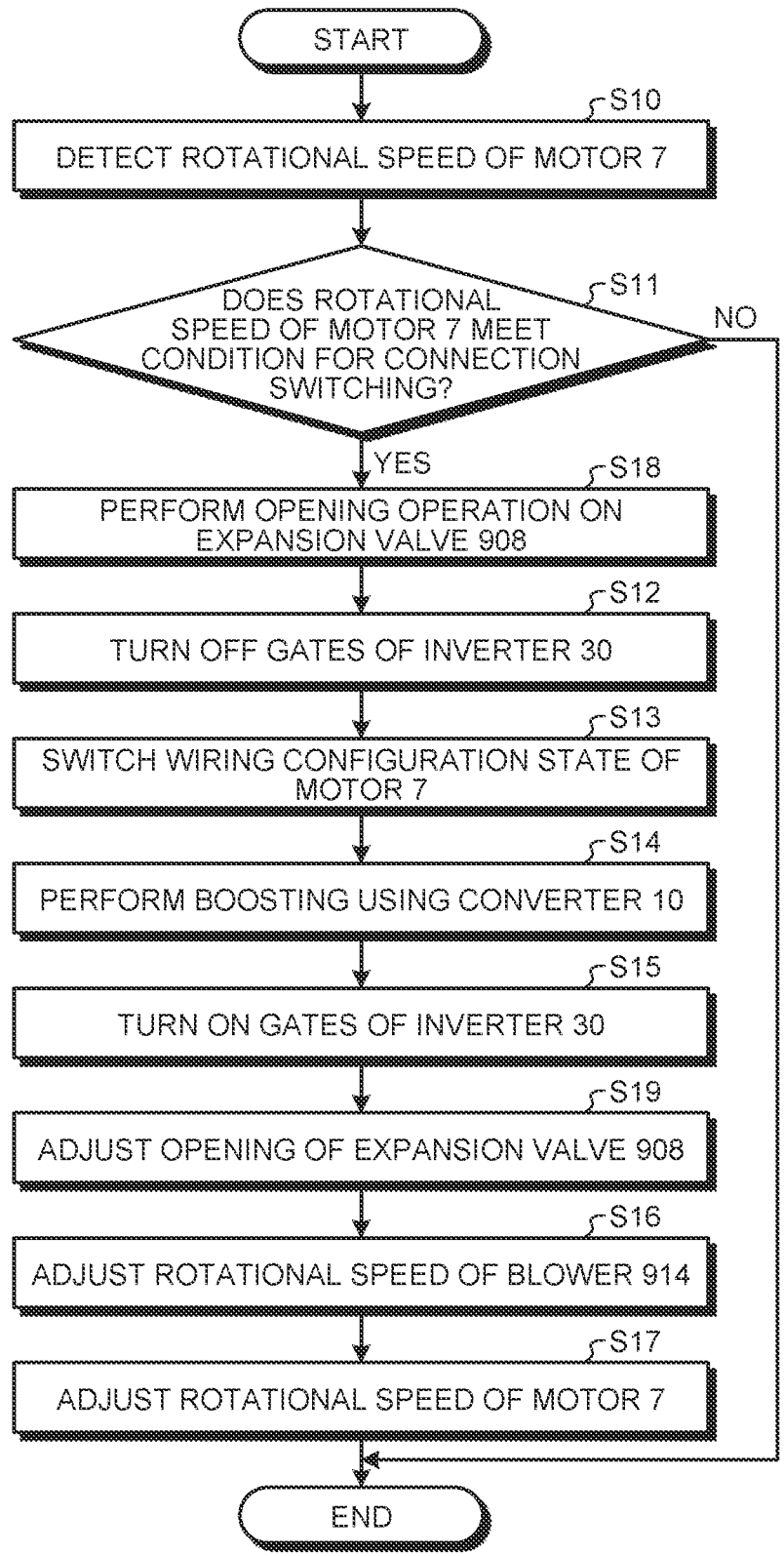
FIG. 16 is a flowchart illustrating an operational procedure for a refrigeration cycle apparatus according to a second embodiment to switch the wiring configuration state of the motor.

FIG. 16 is a flowchart illustrating an operational procedure for a refrigeration cycle apparatus 900 according to a second embodiment to switch the wiring configuration state of the motor 7. The refrigeration cycle apparatus 900 according to the second embodiment differs from the refrigeration cycle apparatus 900 according to the first embodiment in that the expansion valve 908 is opened in addition to the continued rotation of the blower 914 when the connection switching device 60 operates. In the second embodiment, a description is provided mainly of how its operation differs from that of the first embodiment.

If the condition for the connection switching is met (step S11, Yes), the refrigeration cycle apparatus 900 performs opening operation on the expansion valve 908 at step S18. In other words, the refrigeration cycle apparatus 900 opens the expansion valve 908. The refrigeration cycle apparatus 900 depressurizes the refrigerant by opening the expansion valve 908. Thereafter, the motor drive apparatus 2 in the refrigeration cycle apparatus 900 operates to follow step S12 and subsequent steps S13-S15 in the procedure.

After the motor drive apparatus 2 turns on the gates of the inverter 30 at step S15, the refrigeration cycle apparatus 900 adjusts an opening of the expansion valve 908 at step S19. Thereafter, the motor drive apparatus 2 in the refrigeration cycle apparatus 900 operates to follow step S16 and a subsequent step S17 in the procedure. In the operation based on the procedure illustrated in FIG. 16, the refrigeration cycle apparatus 900 has the expansion valve 908 open during a period of the first stage and the second stage in the control by the control device 100.

Figure 17:
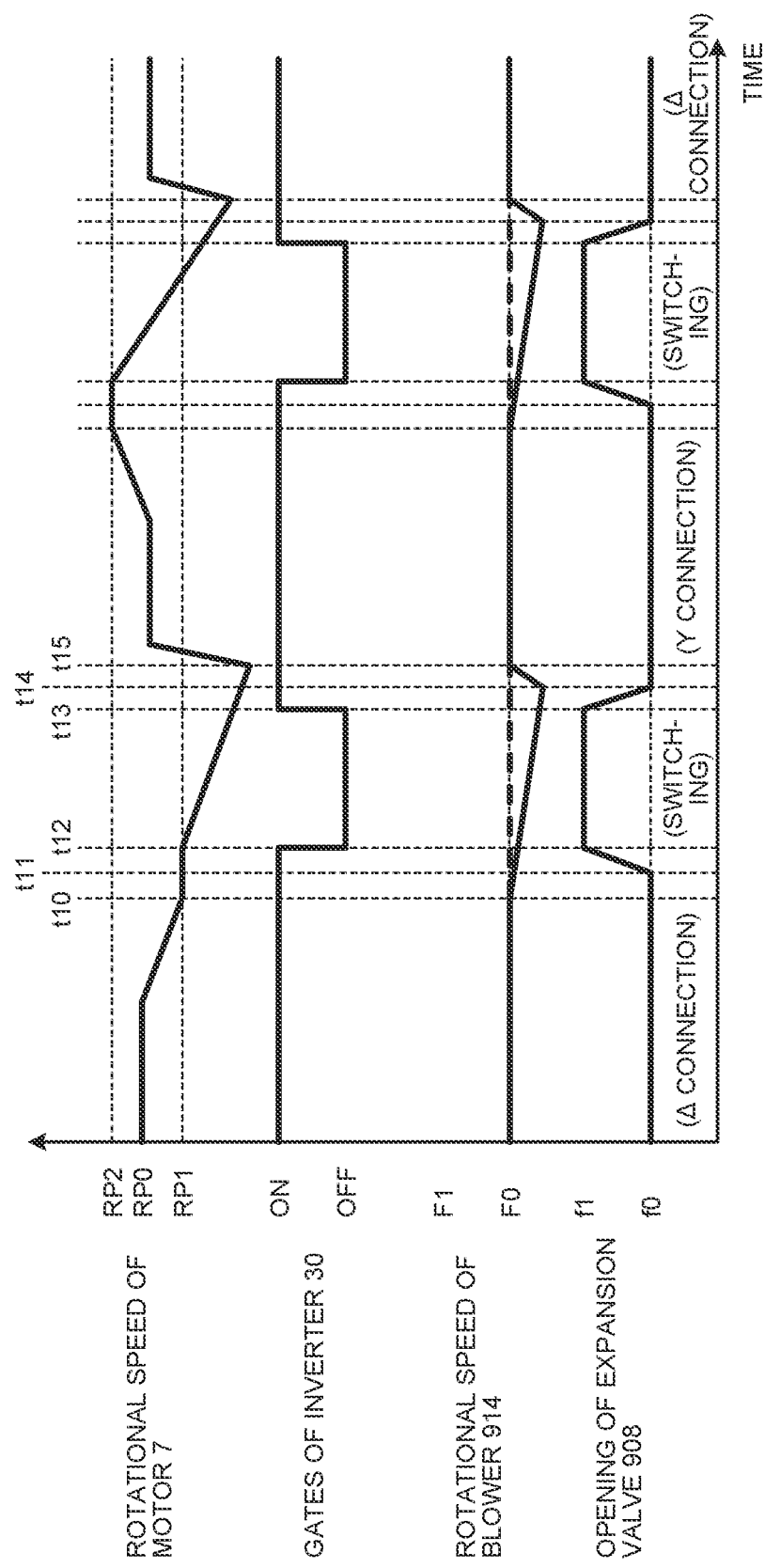
FIG. 17 is a timing chart illustrating an example of an operation of the refrigeration cycle apparatus according to the second embodiment.

FIG. 17 is a timing chart illustrating an example of an operation of the refrigeration cycle apparatus 900 according to the second embodiment. t10, t11, t12, t13, t14, and t15 respectively represent timings in a time series. The rotational speed of the motor 7, an on-off pattern of the gates of the inverter 30, and the rotational speed of the blower 914 change similarly to the case of the first embodiment that is illustrated in FIG. 15.

The blower 914 is kept rotating from t10 through the powered rotation or the inertia rotation, and the refrigeration cycle apparatus 900 increases the opening of the expansion valve 908 from f0 at t11 that comes after t10. In other words, the refrigeration cycle apparatus 900 opens the expansion valve 908. From t11 to t12, the refrigeration cycle apparatus 900 increases the opening to f1. Thereafter, the motor drive apparatus 2 turns off the gates of the inverter 30 at t12.

After switching the wiring configuration of the motor 7, the motor drive apparatus 2 turns on the gates of the inverter 30 at t13. Moreover, the refrigeration cycle apparatus 900 decreases the opening of the expansion valve 908 from f1. From t13 to t14, the refrigeration cycle apparatus 900 decreases the opening to f0. At t14, the motor drive apparatus 2 adjusts the rotational speed of the blower 914. At t15 that comes after t14, the motor drive apparatus 2 increases the rotational speed of the motor 7 to RP0.

When the connection switching device 60 performs the switching operation, in addition to keeping the blower 914 rotating, the refrigeration cycle apparatus 900 according to the second embodiment opens the expansion valve 908 to depressurize the refrigerant, thus reducing its pressure load. By keeping the blower 914 rotating and also opening the expansion valve 908, the refrigeration cycle apparatus 900 is capable of effectively reducing its heat load and the load on the motor 7. In case of the air conditioner 920, effective prevention of a significant decrease in rotational speed of the motor 7 or suspension of the rotation operation of the motor 7 is enabled when the switching operation is to be performed.

The refrigeration cycle apparatus 900 allows for a shorter time for the motor 7 to regain the rotational speed. The refrigeration cycle apparatus 900 can also reduce a decrease in refrigeration cycle capacity that is associated with the switching operation. The air conditioner 920 is enabled to prevent its cooling and heating capacities from decreasing and improve comfort. Moreover, the refrigeration cycle apparatus 900 keeps the blower 914 generating an air flow, thus allowing the load to consume the bus voltage in the motor drive apparatus 2 and preventing an excessive rise in bus voltage. Therefore, the refrigeration cycle apparatus 900 is capable of reducing problems such that the elements in the motor drive apparatus 2 break down due to the increased bus voltage whose influence exceeds their withstand voltages.

As a result, the refrigeration cycle apparatus 900 has an effect of preventing efficiency of the apparatus having the motor 7 from being lowered. In addition, the refrigeration cycle apparatus 900 is capable of preventing problems that might be caused by the excessive rise in bus voltage in the motor drive apparatus 2, thus achieving higher reliability.

Third Embodiment

Figure 18:
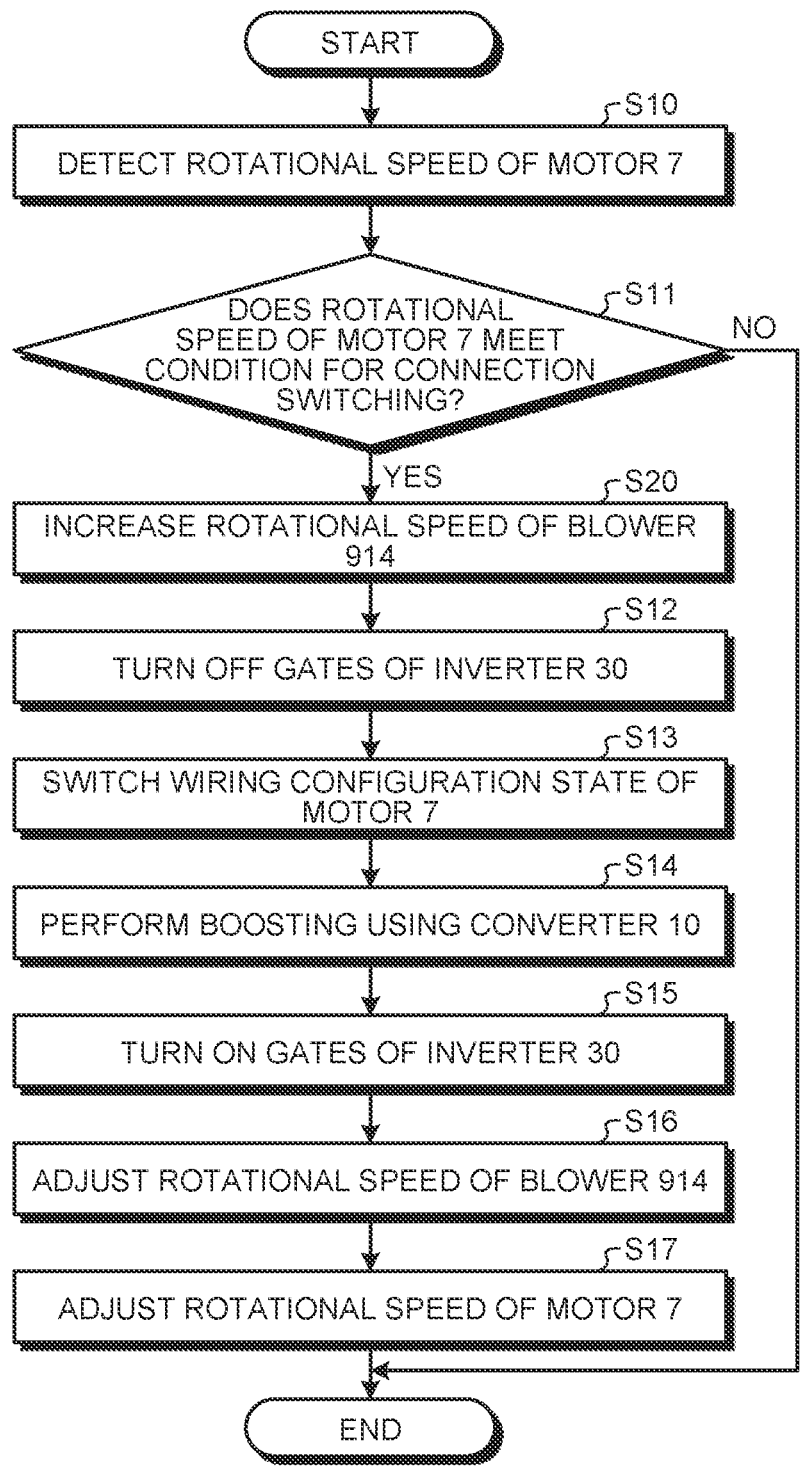
FIG. 18 is a flowchart illustrating an operational procedure for a refrigeration cycle apparatus according to a third embodiment to switch the wiring configuration state of the motor.

FIG. 18 is a flowchart illustrating an operational procedure for a refrigeration cycle apparatus 900 according to a third embodiment to switch the wiring configuration state of the motor 7. The refrigeration cycle apparatus 900 according to the third embodiment differs from that of the first embodiment in that the rotational speed of the blower 914 is increased when the connection switching device 60 operates. In the third embodiment, a description is provided mainly of how its operation differs from that of the first embodiment.

If the condition for the connection switching is met (step S11, Yes), the refrigeration cycle apparatus 900 increases the rotational speed of the blower 914 at step S20. In other words, the control device 200 performs control that increases the rotational speed of the motor 8. By increasing the rotational speed of the blower 914, the refrigeration cycle apparatus 900 further promotes the heat exchange of the heat exchanger 910. Subsequently, the motor drive apparatus 2 in the refrigeration cycle apparatus 900 operates to follow step S12 and subsequent steps S13-S17 in the procedure. At step S16, the refrigeration cycle apparatus 900 adjusts the rotational speed of the blower 914 to bring the rotational speed of the blower 914 back to the original rotational speed.

In the operation based on the procedure illustrated in FIG. 18, the refrigeration cycle apparatus 900 has the motor 8 rotate at the higher speed during a period of the first stage and the second stage in the control by the control device 100 than before the connection state is switched.

Figure 19:
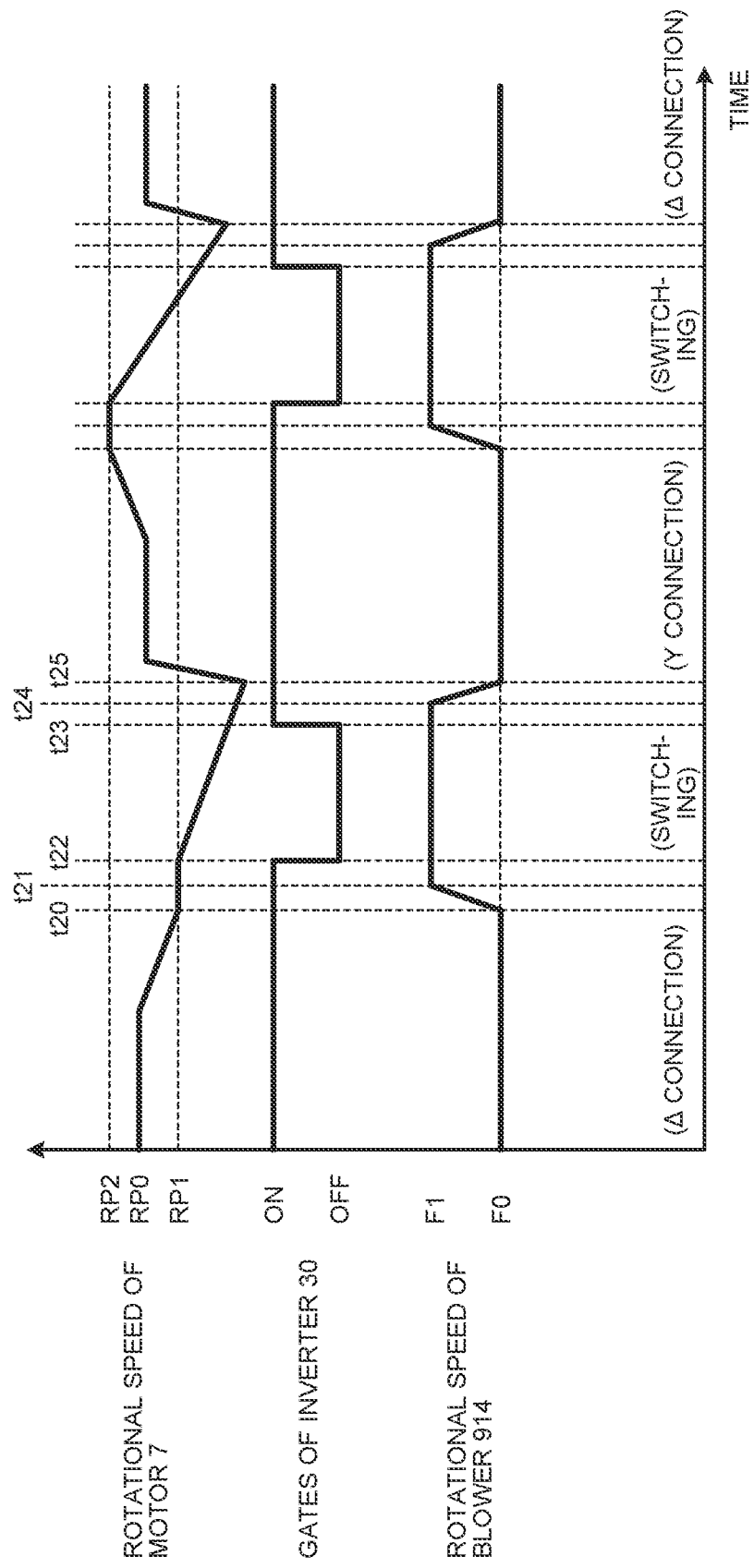
FIG. 19 is a timing chart illustrating an example of an operation of the refrigeration cycle apparatus according to the third embodiment.

FIG. 19 is a timing chart illustrating an example of an operation of the refrigeration cycle apparatus 900 according to the third embodiment. t20, t21, t22, t23, t24, and t25 respectively represent timings in a time series. The rotational speed of the motor 7 and the on-off pattern of the gates of the inverter 30 change similarly to the case of the first embodiment that is illustrated in FIG. 15.

At the timing t20 when the rotational speed of the motor 7, decreasing from RP0, becomes lower than or equal to RP1, the refrigeration cycle apparatus 900 increases the rotational speed of the blower 914 from F0. From t20 to t21, the refrigeration cycle apparatus 900 increases the rotational speed of the blower 914 to F1. Thereafter, the motor drive apparatus 2 turns off the gates of the inverter 30 at t22.

After switching the wiring configuration of the motor 7, the motor drive apparatus 2 turns on the gates of the inverter 30 at t23. Thereafter, at t24, the refrigeration cycle apparatus 900 decreases the rotational speed of the blower 914 from F1. From t24 to t25, the refrigeration cycle apparatus 900 decreases the rotational speed of the blower 914 to the original F0. At t25, the motor drive apparatus 2 increases the rotational speed of the motor 7 to RP0.

When the connection switching device 60 performs the switching operation, the refrigeration cycle apparatus 900 according to the third embodiment not only keeps the blower 914 rotating but also increases the rotational speed of the blower 914. By promoting the heat exchange of the heat exchanger 910, the refrigeration cycle apparatus 900 is capable of effectively reducing its heat load and the load on the motor 7. In case of the air conditioner 920, effective prevention of a significant decrease in rotational speed of the motor 7 or suspension of the rotation operation of the motor 7 is enabled when the switching operation is to be performed.

The refrigeration cycle apparatus 900 allows for a shorter time for the motor 7 to regain the rotational speed. The refrigeration cycle apparatus 900 can also reduce a decrease in refrigeration cycle capacity that is associated with the switching operation. The air conditioner 920 is enabled to prevent its cooling and heating capacities from decreasing and improve comfort. Moreover, the refrigeration cycle apparatus 900 keeps the blower 914 generating an air flow, thus allowing the load to consume the bus voltage in the motor drive apparatus 2 and preventing an excessive rise in bus voltage. Therefore, the refrigeration cycle apparatus 900 is capable of reducing problems such that the elements in the motor drive apparatus 2 break down due to the increased bus voltage whose influence exceeds their withstand voltages.

As a result, the refrigeration cycle apparatus 900 has an effect of preventing efficiency of the apparatus having the motor 7 from being lowered. In addition, the refrigeration cycle apparatus 900 is capable of preventing problems that might be caused by the excessive rise in bus voltage in the motor drive apparatus 2, thus achieving higher reliability.

Fourth Embodiment

FIG. 20 is a flowchart illustrating an operational procedure for a refrigeration cycle apparatus 900 according to a fourth embodiment to switch the wiring configuration state of the motor 7. The refrigeration cycle apparatus 900 according to the fourth embodiment differs from that of the first embodiment in that the expansion valve 908 is opened and the rotational speed of the blower 914 is increased when the connection switching device 60 operates. In the fourth embodiment, a description is provided mainly of how its operation differs from that of the first embodiment.

If the condition for the connection switching is met (step S11, Yes), the refrigeration cycle apparatus 900 increases the rotational speed of the blower 914 at step S20. In other words, the control device 200 performs control that increases the rotational speed of the motor 8. By increasing the rotational speed of the blower 914, the refrigeration cycle apparatus 900 further promotes the heat exchange of the heat exchanger 910.

At step S18, the refrigeration cycle apparatus 900 performs opening operation on the expansion valve 908. In other words, the refrigeration cycle apparatus 900 opens the expansion valve 908. The refrigeration cycle apparatus 900 depressurizes the refrigerant by opening the expansion valve 908. Subsequently, the motor drive apparatus 2 in the refrigeration cycle apparatus 900 operates to follow step S12 and subsequent steps S13-S15 in the procedure.

After the motor drive apparatus 2 turns on the gates of the inverter 30 at step S15, the refrigeration cycle apparatus 900 adjusts the opening of the expansion valve 908 at step S19. At step S16, the refrigeration cycle apparatus 900 adjusts the rotational speed of the blower 914 to bring the rotational speed of the blower 914 back to the original rotational speed.

In the operation based on the procedure illustrated in FIG. 20, the refrigeration cycle apparatus 900 has the motor 8 rotate at the higher speed during a period of the first stage and the second stage in the control by the control device 100 than before the connection state is switched. In the operation based on the procedure illustrated in FIG. 20, the refrigeration cycle apparatus 900 has the expansion valve 908 open to depressurize the refrigerant during a period of the first stage and the second stage in the control by the control device 100 than before the connection state is switched.

When the connection switching device 60 performs the switching operation, the refrigeration cycle apparatus 900 according to the fourth embodiment opens the expansion valve 908 to depressurize the refrigerant, thus reducing its pressure load. The refrigeration cycle apparatus 900 also increases the rotational speed of the blower 914 when the connection switching device 60 performs the switching operation. By opening the expansion valve 908 and promoting the heat exchange of the heat exchanger 910, the refrigeration cycle apparatus 900 is capable of effectively reducing its heat load and the load on the motor 7. In case of the air conditioner 920, effective prevention of a significant decrease in rotational speed of the motor 7 or suspension of the rotation operation is enabled when the switching operation is to be performed.

The refrigeration cycle apparatus 900 allows for a shorter time for the motor 7 to regain the rotational speed. The refrigeration cycle apparatus 900 can also reduce a decrease in refrigeration cycle capacity that is associated with the switching operation. The air conditioner 920 is enabled to prevent its cooling and heating capacities from decreasing and improve comfort. Moreover, the refrigeration cycle apparatus 900 keeps the blower 914 generating an air flow, thus allowing the load to consume the bus voltage in the motor drive apparatus 2 and preventing an excessive rise in bus voltage. Therefore, the refrigeration cycle apparatus 900 is capable of reducing problems such that the elements in the motor drive apparatus 2 break down due to the increased bus voltage whose influence exceeds their withstand voltages.

As a result, the refrigeration cycle apparatus 900 has an effect of preventing efficiency of the apparatus having the motor 7 from being lowered. In addition, the refrigeration cycle apparatus 900 is capable of preventing problems that might be caused by the excessive rise in bus voltage in the motor drive apparatus 2, thus achieving higher reliability.

The above configurations illustrated in the embodiments are illustrative of contents of the present disclosure. The configurations of the embodiments can be combined with other techniques that are publicly known. The configurations of the embodiments may be combined with each other as appropriate. The configurations of the embodiments can be partly omitted or changed without departing from the gist of the present disclosure.

The invention claimed is:

1. A motor drive apparatus comprising:
connection switching circuitry including a switch, and to switch a connection state of a winding of a first motor through switching operation of the switch during rotation operation of the first motor, the first motor being a drive source for a compressor;
an inverter to apply an alternating-current voltage to the winding via the switch;
a first controller to control the inverter and the connection switching circuitry; and
a second controller to control a second motor, the second motor being a drive source for a blower that is an element that affects a load on the first motor, wherein control that the first controller performs when switching the connection state includes a first stage of bringing an effective value of alternating current that is to flow through the winding close to zero compared to an effective value of alternating current that has flowed through the winding before the connection state is switched and a second stage of suspending output of the alternating-current voltage from the inverter,
the second controller keeps the second motor running by an inertia rotation or a powered rotation during a period including the first stage and the second stage, and
the first controller causes the switch to perform the switching operation in the second stage.

2. The motor drive apparatus according to claim 1, further comprising
current detection circuitry to detect a current supplied to the inverter, wherein the first controller controls the inverter based on a result of the detection by the current detection circuitry.

3. The motor drive apparatus according to claim 1, wherein switching the connection state refers to switching a wiring configuration state of the winding between a star connection and a delta connection.

4. The motor drive apparatus according to claim 1, wherein switching the connection state refers to changing a number of turns of the winding.

5. The motor drive apparatus according to claim 1, wherein
the switch includes an electromagnetic contactor,
the electromagnetic contactor includes an excitation coil and a contact to be driven by a current flow through the excitation coil, and
the first controller controls the connection switching circuitry through control of a current supply to the excitation coil.

6. The motor drive apparatus according to claim 1, wherein
the first stage includes a current control period of less than or equal to 1 second as a period for bringing an effective value of alternating current that is to flow through the winding close to zero compared to an effective value of alternating current that has flowed through the winding before the connection state is switched.

7. A refrigeration cycle apparatus comprising the motor drive apparatus according to claim 1.

8. The refrigeration cycle apparatus according to claim 7, further comprising
an expansion valve to expand a refrigerant, wherein the expansion valve is open during a period including the first stage and the second stage.

9. An air conditioner comprising the refrigeration cycle apparatus according to claim 7.

10. A water heater comprising the refrigeration cycle apparatus according to claim 7.

11. A refrigerator comprising the refrigeration cycle apparatus according to claim 7.

* * * * *